(12) United States Patent
Boulet et al.

(10) Patent No.: US 8,940,072 B2
(45) Date of Patent: Jan. 27, 2015

(54) PARALLEL PASSAGE FLUID CONTACTOR STRUCTURE

(75) Inventors: Andre Boulet, Vancouver (CA); Soheil Khiavi, Burnaby (CA)

(73) Assignee: Inventys Thermal Technologies Inc., Burnaby (CA)

( * ) Notice: Subject to any disclaimer, the term of this patent is extended or adjusted under 35 U.S.C. 154(b) by 252 days.

(21) Appl. No.: 13/203,714

(22) PCT Filed: Feb. 26, 2010

(86) PCT No.: PCT/CA2010/000251
§ 371 (c)(1),
(2), (4) Date: Aug. 26, 2011

(87) PCT Pub. No.: WO2010/096916
PCT Pub. Date: Sep. 2, 2010

(65) Prior Publication Data
US 2011/0311761 A1    Dec. 22, 2011

Related U.S. Application Data

(60) Provisional application No. 61/208,807, filed on Feb. 27, 2009.

(51) Int. Cl.
*B01D 39/06* (2006.01)
*B01D 39/20* (2006.01)
(Continued)

(52) U.S. Cl.
CPC ........... *B01D 53/0462* (2013.01); *B01J 12/007* (2013.01); *B01J 19/2485* (2013.01);
(Continued)

(58) Field of Classification Search
CPC ..... C04B 35/00; F01N 3/0222; F01N 3/2846; F01N 2330/06; B01D 2045/2496
USPC ............ 55/522–524; 422/169–172, 177–182; 13/522–524
See application file for complete search history.

(56) References Cited

U.S. PATENT DOCUMENTS 4,101,287 A    7/1978  Sweed et al.
4,276,066 A *  6/1981  Bly et al. ................. 55/287
(Continued)

FOREIGN PATENT DOCUMENTS

CA    2446503    11/2009
CA    2501173    5/2011
(Continued)

*Primary Examiner* — Amber Orlando
(74) *Attorney, Agent, or Firm* — Palmer IP; Graeme A. Herring

(57) ABSTRACT

A parallel passage fluid contactor structure for chemical reaction processes has one or more segments, where each segment has a plurality of substantially parallel fluid flow passages oriented in an axial direction; cell walls between each adjacent fluid flow passages and each cell wall has at least two opposite cell wall surfaces. The structure also includes at least one active compound in the cell walls and multiple axially continuous conductive filaments either embedded within the cell walls or situated between the cell wall surfaces. The conductive filaments are at least one of thermally and electrically conductive, are oriented in axially, and are in direct contact with the active compound, and are operable to transfer thermal energy between the active material and the conductive filaments. Heating of the conductive filaments may be used to transfer heat to the active material in the cell walls. Methods of manufacturing the structure are discussed.

22 Claims, 10 Drawing Sheets

(51) Int. Cl.
  *B01D 39/14* (2006.01)
  *B01D 24/00* (2006.01)
  *B01D 50/00* (2006.01)
  *B01D 53/04* (2006.01)
  *B01J 12/00* (2006.01)
  *B01J 19/24* (2006.01)
  *C04B 38/00* (2006.01)
  *C04B 111/00* (2006.01)
  *C04B 111/94* (2006.01)
  *F28D 9/04* (2006.01)
  *F28F 3/02* (2006.01)
  *F28F 7/02* (2006.01)

(52) U.S. Cl.
  CPC ......... *C04B38/0006* (2013.01); *C04B 38/0083* (2013.01); *H05N 3/50* (2013.01); *B01D 2253/102* (2013.01); *B01D 2253/104* (2013.01); *B01D 2253/108* (2013.01); *B01D 2253/204* (2013.01); *B01J 2219/0004* (2013.01); *B01J 2219/00135* (2013.01); *C04B 2111/00379* (2013.01); *C04B 2111/0081* (2013.01); *C04B 2111/94* (2013.01); *F28D 9/04* (2013.01); *F28F 3/025* (2013.01); *F28F 7/02* (2013.01); *H05B 2203/021* (2013.01); *H05B 2203/022* (2013.01); *H05B 2203/024* (2013.01)
  USPC ................. 55/523; 55/522; 55/524; 422/169; 422/170; 422/171; 422/172; 422/177; 422/178; 422/179; 422/180; 422/181; 422/182

(56) References Cited

U.S. PATENT DOCUMENTS

| | | | |
|---|---|---|---|
| 4,505,107 A * | 3/1985 | Yamaguchi et al. | 60/303 |
| 4,707,167 A | 11/1987 | Saito et al. | |
| 4,872,889 A * | 10/1989 | Lepperhoff et al. | 55/282.3 |
| 5,140,812 A * | 8/1992 | Cornelison et al. | 60/300 |
| 5,207,807 A * | 5/1993 | Manfre et al. | 55/282.1 |
| 5,232,882 A | 8/1993 | Yoshimoto et al. | |
| 5,259,190 A * | 11/1993 | Bagley et al. | 60/300 |
| 5,308,457 A | 5/1994 | Dalla Betta et al. | |
| 5,319,929 A * | 6/1994 | Cornelison et al. | 60/274 |
| 5,338,450 A | 8/1994 | Maurer | |
| 5,370,943 A * | 12/1994 | Bruck et al. | 428/593 |
| 5,388,637 A | 2/1995 | Jones | |
| 5,393,586 A | 2/1995 | Lipp | |
| 5,482,685 A * | 1/1996 | Fujita et al. | 422/174 |
| 5,505,825 A | 4/1996 | Gold et al. | |
| 5,525,309 A * | 6/1996 | Breuer et al. | 422/174 |
| 5,560,757 A * | 10/1996 | Suzuki et al. | 55/516 |
| 5,562,885 A * | 10/1996 | Bayer et al. | 422/174 |
| 5,569,455 A * | 10/1996 | Fukui et al. | 422/174 |
| 5,618,498 A * | 4/1997 | Konya et al. | 422/174 |
| 5,628,819 A | 5/1997 | Mestemaker et al. | |
| 5,628,928 A * | 5/1997 | Rolf | 219/488 |
| 5,680,503 A * | 10/1997 | Abe et al. | 392/485 |
| 5,693,123 A | 12/1997 | Klobucar | |
| 5,733,352 A * | 3/1998 | Ogawa et al. | 55/523 |
| 5,750,026 A | 5/1998 | Gadkaree | |
| 5,827,355 A | 10/1998 | Wilson et al. | |
| 5,912,424 A | 6/1999 | Judkins | |
| 5,938,802 A * | 8/1999 | Saito et al. | 55/282.3 |
| 5,972,077 A | 10/1999 | Judkins | |
| 6,090,477 A | 7/2000 | Burchell et al. | |
| 6,097,011 A | 8/2000 | Gadkaree | |
| 6,287,524 B1 * | 9/2001 | Hums et al. | 422/180 |
| 6,364,936 B1 | 4/2002 | Rood et al. | |
| 6,375,716 B1 | 4/2002 | Burchell et al. | |
| 6,514,318 B2 | 2/2003 | Keefer | |
| 6,652,627 B1 | 11/2003 | Tonkovich et al. | |
| 6,699,561 B2 | 3/2004 | Wolff | |
| 6,716,339 B2 | 4/2004 | Liu, Jr. | |
| 6,790,417 B2 | 9/2004 | Boger | |
| 6,797,243 B2 | 9/2004 | Arcuri et al. | |
| 6,936,561 B2 | 8/2005 | Marques et al. | |
| 6,964,695 B2 | 11/2005 | Place et al. | |
| 7,083,663 B2 * | 8/2006 | Shih et al. | 95/283 |
| 7,129,194 B2 | 10/2006 | Baca et al. | |
| 7,141,092 B1 | 11/2006 | Roychoudhury et al. | |
| 7,244,689 B2 | 7/2007 | Addiego et al. | |
| 7,252,809 B2 * | 8/2007 | Bruck et al. | 422/181 |
| 7,317,871 B2 | 1/2008 | Tennison et al. | |
| 7,413,713 B2 | 8/2008 | Sano et al. | |
| 7,442,218 B2 * | 10/2008 | Okubo et al. | 55/282.3 |
| 7,731,782 B2 | 6/2010 | Kelley et al. | |
| 7,785,544 B2 * | 8/2010 | Alward et al. | 422/179 |
| 7,938,886 B2 | 5/2011 | Hershkowitz et al. | |
| 7,947,120 B2 | 5/2011 | Deckman et al. | |
| 7,947,624 B2 * | 5/2011 | Tsuchiya et al. | 502/439 |
| 7,959,720 B2 | 6/2011 | Deckman et al. | |
| 8,052,783 B2 | 11/2011 | Baker | |
| 8,112,989 B1 * | 2/2012 | Phelps et al. | 60/299 |
| 8,377,173 B2 | 2/2013 | Chuang | |
| 8,444,729 B2 * | 5/2013 | Bailey et al. | 55/282.3 |
| 8,444,750 B2 | 5/2013 | Deckman et al. | |
| 8,496,734 B2 | 7/2013 | Gadkaree | |
| 8,529,662 B2 | 9/2013 | Kelley et al. | |
| 8,529,663 B2 | 9/2013 | Reyes et al. | |
| 8,529,664 B2 | 9/2013 | Deckman et al. | |
| 8,545,602 B2 | 10/2013 | Chance et al. | |
| 8,628,608 B2 | 1/2014 | Jensen et al. | |
| 2001/0001435 A1 * | 5/2001 | Palekar et al. | 204/164 |
| 2001/0043890 A1 * | 11/2001 | Son | 422/174 |
| 2003/0233824 A1 * | 12/2003 | Chun et al. | 60/275 |
| 2004/0057880 A1 * | 3/2004 | Treutler et al. | 422/186.04 |
| 2004/0206061 A1 * | 10/2004 | Ichikawa | 55/523 |
| 2004/0213708 A1 * | 10/2004 | Wagner et al. | 422/180 |
| 2005/0095188 A1 * | 5/2005 | Matsumoto et al. | 423/213.2 |
| 2005/0229564 A1 * | 10/2005 | Okubo et al. | 55/523 |
| 2008/0141638 A1 * | 6/2008 | Linhart et al. | 55/520 |
| 2008/0155950 A1 | 7/2008 | Blackwell et al. | |
| 2008/0282885 A1 | 11/2008 | Deckman et al. | |
| 2008/0282886 A1 | 11/2008 | Reyes et al. | |
| 2008/0282892 A1 | 11/2008 | Deckman et al. | |
| 2009/0326279 A1 | 12/2009 | Tonkovich et al. | |
| 2010/0212495 A1 | 8/2010 | Gadkaree | |
| 2010/0242728 A1 | 9/2010 | Radosz | |
| 2010/0263534 A1 | 10/2010 | Chuang | |
| 2010/0300053 A1 * | 12/2010 | Alary | 55/523 |
| 2011/0206896 A1 * | 8/2011 | Humphrey et al. | 428/117 |
| 2012/0222551 A1 | 9/2012 | Deckman | |

FOREIGN PATENT DOCUMENTS

| | | |
|---|---|---|
| CA | 2688545 | 8/2013 |
| EP | 0578371 | 8/1999 |
| EP | 1080773 | 3/2001 |
| EP | 1208906 | 5/2002 |
| EP | 1375851 | 1/2004 |
| EP | 1710008 | 10/2006 |
| EP | 1874437 | 1/2008 |
| EP | 1894611 | 3/2008 |
| EP | 1928580 | 6/2008 |
| EP | 1997550 | 12/2008 |
| EP | 2164600 | 3/2010 |
| EP | 2164601 | 3/2010 |
| EP | 2164602 | 3/2010 |
| EP | 2164603 | 3/2010 |
| EP | 2164604 | 3/2010 |
| EP | 2164605 | 3/2010 |
| EP | 2164606 | 3/2010 |
| EP | 2164607 | 3/2010 |
| EP | 2188037 | 5/2010 |
| EP | 2214814 | 8/2010 |
| EP | 2234695 | 10/2010 |
| EP | 1562688 | 2/2011 |
| EP | 2602032 | 6/2013 |
| WO | 2006101366 | 9/2006 |
| WO | 2006127889 | 11/2006 |
| WO | 2007024132 | 3/2007 |
| WO | 2007043863 | 4/2007 |
| WO | 2008143821 | 11/2008 |

(56) References Cited

FOREIGN PATENT DOCUMENTS

| | | |
|---|---|---|
| WO | 2008143823 | 11/2008 |
| WO | 2008143825 | 11/2008 |
| WO | 2008143826 | 11/2008 |
| WO | 2008143964 | 11/2008 |
| WO | 2008143966 | 11/2008 |
| WO | 2008143967 | 11/2008 |
| WO | 2008143968 | 11/2008 |
| WO | 2008147676 | 12/2008 |
| WO | 2009036247 | 3/2009 |
| WO | 2009061470 | 5/2009 |
| WO | 2009092784 | 7/2009 |
| WO | 2010096916 | 9/2010 |
| WO | 2010099208 | 9/2010 |
| WO | 2012118748 | 9/2012 |

\* cited by examiner ously low thermal conductivity which may result in undesirably large temperature differences within the structure, for example. Such undesirable thermal characteristics of certain parallel passage fluid contactors of the prior art may result in increased costs related to thermal regeneration of fluid contactors, and/or limited efficiency of chemical separations or reactions within the fluid contactors of the prior art.

PARALLEL PASSAGE FLUID CONTACTOR STRUCTURE

1. TECHNICAL FIELD

The present invention relates generally to parallel passage fluid contactor structures. More particularly, the present invention relates to a thermally conductive parallel passage fluid contactor structure and method for its manufacture.

2. BACKGROUND OF THE INVENTION

Fluid contactor structures are known in the art for use in chemical processes requiring intimate contact of fluids with an active compound, such as adsorption or catalysis processes for example. Exemplary known fluid contactor structures include ceramic honeycomb structures for exhaust gas catalysis, and packed bead or parallel plate adsorbent structures for adsorptive gas separation processes such as thermal and/or pressure swing adsorption processes. However, a shortcoming of certain of the parallel passage fluid contactor structures of the prior art relates to poor thermal characteristics of the structure. In particular, prior art parallel passage fluid contactors may have undesirably high thermal mass which may require an undesirably large thermal energy flux to effect a given temperature change in the structure, or may have undesirably low thermal conductivity which may result in undesirably large temperature differences within the structure, for example. Such undesirable thermal characteristics of certain parallel passage fluid contactors of the prior art may result in increased costs related to thermal regeneration of fluid contactors, and/or limited efficiency of chemical separations or reactions within the fluid contactors of the prior art.

3. SUMMARY OF THE INVENTION

It is an object of the present invention to provide a parallel passage fluid contactor structure that addresses some of the limitations of the prior art.

Another object of the present invention is to provide a method of manufacturing a parallel passage fluid contactor structure that addresses some of the limitations of the prior art.

It is a further object of the invention to provide a thermal swing adsorption separation process for separating first and second fluid components using a parallel passage fluid contactor structure according to the present invention that addresses some of the limitations of the prior art.

It is yet a further object of the invention to provide a catalytic reaction process for catalysis reaction of a first fluid component with a parallel passage fluid contactor structure according to the present invention that addresses some of the limitations of the prior art.

A parallel passage fluid contactor structure comprising one or more segments is provided according to one embodiment of the present invention. Each segment comprises a plurality of substantially parallel fluid flow passages oriented in an axial direction; cell walls situated between each adjacent one of said fluid flow passages, each said cell wall comprising at least two opposite cell wall surfaces, and additionally comprising at least one active compound; and a plurality of axially continuous conductive filaments either embedded within said cell walls or situated between said surfaces of said cell walls. Said axially continuous conductive filaments are at least one of thermally and electrically conductive, are oriented in said axial direction, and are additionally in direct contact with said at least one active compound of said cell walls and are operable to transfer thermal energy between said at least one active material and said conductive filaments.

In another embodiment of the present invention, a parallel passage fluid contactor structure is provided comprising one or more segments where each segment comprises a plurality of substantially parallel fluid flow passages oriented in an axial direction; cell walls situated between each adjacent one of said fluid flow passages and arranged in a honeycomb configuration, said cell walls comprising at least one of a ceramic, carbon and polymer material and each said cell wall comprising at least two opposite cell wall surfaces; and a plurality of axially continuous conductive filaments either embedded within said cell walls or situated between said surfaces of said cell walls. Said axially continuous conductive filaments are at least one of thermally and electrically conductive, are oriented in said axial direction, and are operable to transfer thermal energy between said cell walls and said conductive filaments.

According to another embodiment of the invention, a method of manufacturing a parallel passage fluid contactor structure is provided. The method comprises providing a slurry comprising at least one structural compound; extruding said slurry through a die in an axial direction to produce at least one green parallel passage structure segment comprising a plurality of substantially parallel fluid passages oriented in said axial direction, and cell walls comprising said structural compound between adjacent said fluid passages; embedding a plurality of axially continuous conductive filaments within said cell walls, wherein said axially continuous conductive filaments are at least one of thermally and electrically conductive, are oriented in said axial direction, and are operable to transfer thermal energy between at least a portion of said cell walls and said conductive filaments; and curing said green parallel passage structure segment.

According to yet another embodiment, a further method of manufacturing a stacked or corrugated parallel passage fluid contactor structure is provided. Such further method comprises providing a slurry comprising at least one structural compound; extruding or casting said slurry to produce green structural sheet components; forming said structural sheet components into at least one green structure segment comprising said a plurality of substantially parallel fluid passages oriented in an axial direction, and cell walls comprising said structural compound between adjacent said fluid passages; embedding a plurality of axially continuous conductive filaments within said cell walls, wherein said axially continuous conductive filaments are at least one of thermally and electrically conductive, are oriented in said axial direction, and are operable to transfer thermal energy between at least a portion of said cell walls and said conductive filaments; stacking or concentrically rolling said green structure segment to form a multilayer green parallel passage fluid contactor structure segment; and curing said green parallel passage structure segment.

In a further embodiment of the present invention, a temperature swing adsorption process for separating first and second fluid components is provided. Such temperature swing adsorption process comprises admitting said first and second fluid components into a parallel passage fluid contactor structure in a first axial direction, said parallel passage fluid contactor structure comprising a plurality of substantially parallel fluid flow passages oriented in said axial direction, cell walls situated between each adjacent one of said fluid flow passages with each said cell wall comprising at least two opposite cell wall surfaces, and additionally comprising at least one adsorbent compound and a plurality of axially continuous conductive filaments either embedded within said cell walls or situated between said surfaces of said cell walls, wherein said axially continuous conductive filaments are at least one of thermally and electrically conductive, are oriented in said axial direction, and are additionally in direct contact with said at least one adsorbent compound of said cell walls and are operable to transfer thermal energy between said at least one adsorbent material and said conductive filaments. Said method further comprises adsorbing at least a portion of said first fluid component on said at least one adsorbent material comprised in said cell walls wherein at least a portion of the heat of adsorption of said adsorbing of said first fluid component is transferred axially along said filaments during said adsorbing step; recovering a product fluid enriched in said second fluid component; and desorbing at least a portion of said first fluid component adsorbed on said at least one adsorbent material by heating said conductive filaments.

In another embodiment of the present invention, a catalytic reaction process for catalysis of a first fluid component is provided. Such catalytic reaction process comprises admitting said first fluid component into a parallel passage fluid contactor structure in a first axial direction, said parallel passage fluid contactor structure comprising a plurality of substantially parallel fluid flow passages oriented in said axial direction, cell walls situated between each adjacent one of said fluid flow passages with each said cell wall comprising at least two opposite cell wall surfaces, and additionally comprising at least one active catalytic compound either applied to or comprised within said cell walls, and a plurality of axially continuous conductive filaments either embedded within said cell walls or situated between said surfaces of said cell walls, wherein said axially continuous conductive filaments are at least one of thermally and electrically conductive, are oriented in said axial direction, and are additionally in direct contact with said at least one active catalytic compound and are operable to transfer thermal energy between said at least one active catalytic compound and said conductive filaments. Said catalytic reaction process further comprises contacting at least a portion of said first fluid component with said active catalytic compound to catalyze at least one reaction to produce a second fluid component; recovering a product fluid comprising said second fluid component; and regenerating at least a portion of said active catalytic compound by heating said conductive filaments.

Further advantages of the invention will become apparent when considering the drawings in conjunction with the detailed description.

4. BRIEF DESCRIPTION OF THE DRAWINGS

The parallel passage fluid contactor structure of the present invention will now be described with reference to the accompanying drawing figures, in which.

Like reference numerals refer to corresponding parts throughout the several views of the drawings.

5. DETAILED DESCRIPTION OF THE INVENTION

Figure 1:
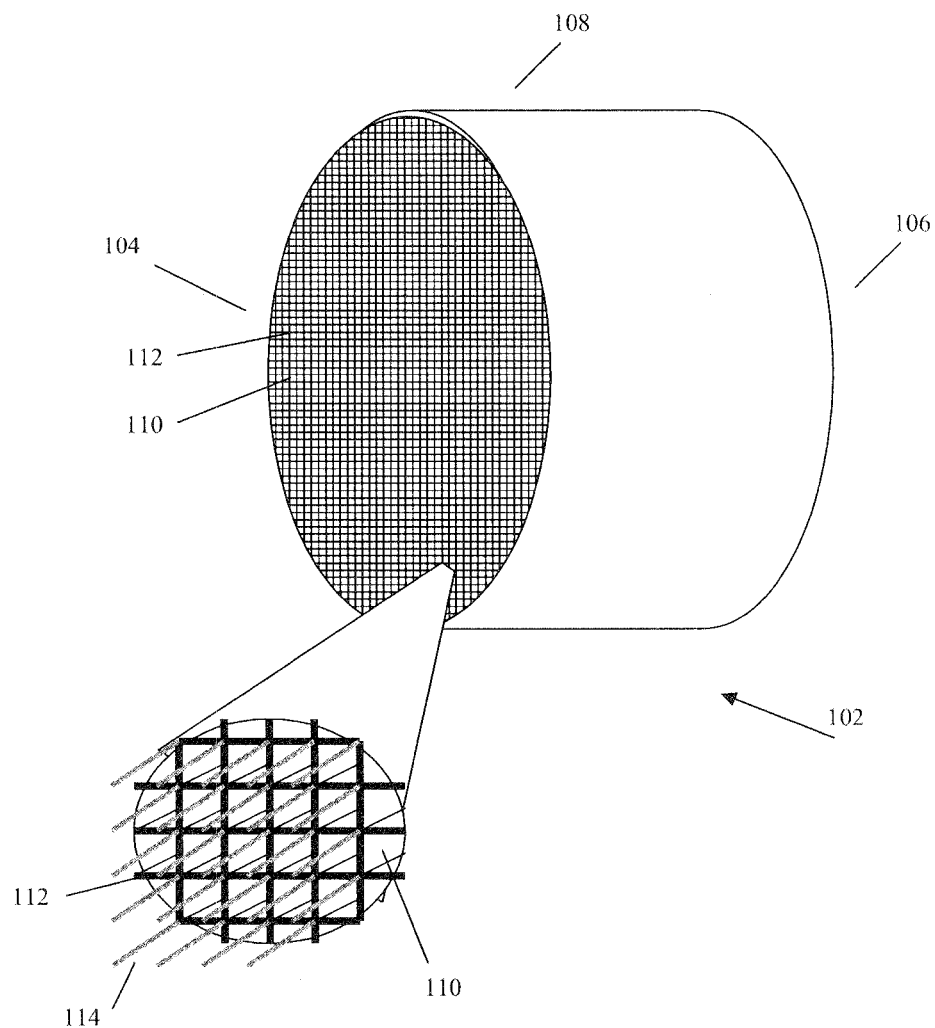
FIG. 1 illustrates a cross-sectional and corresponding inset perspective view of a parallel passage fluid contactor structure according to an embodiment of the present invention.

FIG. 1 illustrates an exemplary parallel passage fluid contactor structure according to an embodiment of the invention. The exemplary parallel passage fluid contactor structure indicated generally at 102 comprises a substantially cylindrical shape defined by substantially cylindrical outer surface 108. The exemplary structure 102 is shown with first and second ends 104 and 106, with multiple substantially parallel passages 110 extending axially along the length of the structure 102, from the first end 104 to the second end 106. The parallel passages 110 are preferably continuous along the length of the structure 102 and are adapted to allow the flow of fluid through the passages 110. Parallel passages 110 are separated from each other by cell walls 112 to form an exemplary honeycomb structure wherein each passage 110 is substantially separated from adjacent passages 110 by at least one cell wall 112. Parallel passage contactor structure 102 also comprises axially continuous conductive filaments 114 embedded in or otherwise situated within cell walls 112, in order to provide at least one of thermal and/or electrical conductivity capacity for the parallel passage contactor structure 102 in the axial direction. In one embodiment, the parallel passage fluid contactor structure 102 may be a substantially honeycomb structure, as illustrated in FIG. 1, wherein cell walls 112 are substantially arranged in a grid pattern, such as a rectangular grid as shown in FIG. 1.

Figure 2:
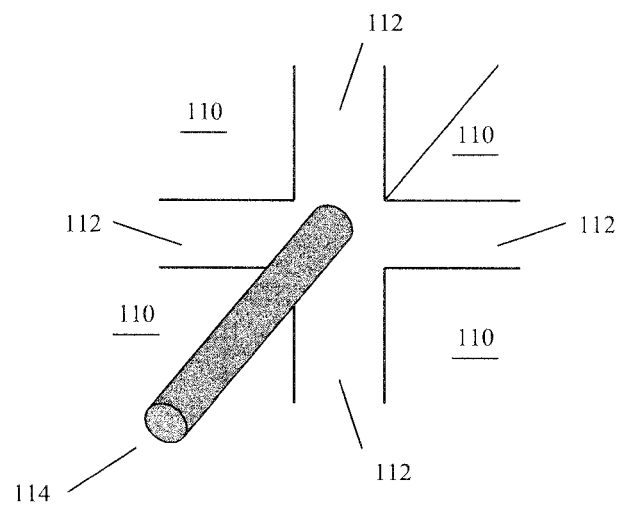
FIG. 2 illustrates a detailed cross-sectional perspective view of the parallel passage fluid contactor structure shown in FIG. 1 according to an embodiment of the invention.

Similarly, FIG. 2 illustrates a detailed cross-sectional perspective view of the parallel passage fluid contactor structure shown in FIG. 1 having a substantially rectangular grid honeycomb structure, according to an embodiment of the invention. In such a rectangular grid honeycomb structure 102 as shown in FIGS. 1 and 2, axially continuous and thermally and/or electrically conductive filaments 114 may advantageously be embedded in or otherwise situated within cell walls 112 at the intersection of two cell walls 112, which corresponds generally with a corner of each adjacent parallel passage 110. In such a manner, the axially continuous and thermally and/or electrically conductive filaments 114 may be advantageously located proximate to multiple adjoining parallel passages 110, such that the thermal and/or electrical conductivity capacity provided by the filaments 114 is in close proximity to multiple parallel passages 110 and to the fluid that may be contained in or passed through such parallel passages 110 during use of the parallel passage fluid contactor structure. In alternative embodiments, honeycomb structures with cell walls 112 arranged in alternative geometric arrangements may be utilized, for example having cell walls in a hexagonal, triangular, or other polygonal grid arrangement, resulting in substantially similarly shaped parallel fluid flow passages 110. Further, other embodiments may comprise parallel passages 110 with cross sectional shapes other than polygons, such as circular, semi-circular, oval, or obround (a shape with two semicircles connected by parallel lines connecting their endpoints) cross-sections, for example. Also, in other alternative embodiments, axially continuous conductive filaments 114 may be embedded in or otherwise located within cell walls 112 either at the intersections of cell walls 112, or at other locations, such as within cell walls 112 between such intersections for example.

In the honeycomb parallel passage fluid contactor structures 102 as illustrated in FIGS. 1 and 2, and in other alternative embodiments as described above, axially continuous and thermally and/or electrically conductive filaments 114 may desirably be used to conduct thermal energy (either as sensible thermal energy or as thermal energy resulting from electrical resistance heating of the filaments) into or out of the structure 102 or axially from one portion of the structure 102 to another, and accordingly to provide for respective heating and/or cooling of portions of or the entire structure 102. In particular, at least a portion of the axially continuous thermally and/or electrically conductive filaments 114 of structure 102 may desirably be thermally connected to a source or sink of thermal energy, in order to conduct thermal energy into or out of the structure 102. Such thermal energy conducted into or out of the structure 102 may desirably increase or decrease the temperature of the structure 102, such as cell walls 112, and/or may transfer thermal energy into or out of a fluid within the passages 110 of the fluid contactor structure 102. Exemplary thermal circuits comprising connections of thermally and/or electrically conductive filaments 114 of the fluid contactor structure 102 to controllable heat sources and/or heat sinks may be employed to provide controllable heating and cooling of the cell walls 112 of the structure through transfer of thermal energy into and/or out of the structure 102 via the conductive filaments 114, allowing for thermal control of the structure 102 or a fluid passed through the structure 102 via an exemplary thermal and/or electrical circuit connected to the conductive filaments 114. Further, axially continuous thermally and/or electrically conductive filaments 114 also provide for the transfer of thermal energy in the axial direction within the structure 102 itself, such as from the first end 104 of the structure 102 to the second end 106, which may be particularly desirable to provide control of a thermal profile along the axial length of the structure 102, for example. In such a manner, embodiments of the invention may desirably provide control of the thermal conditions and profile within the parallel passage fluid contactor structure 102 that is independent of the temperature of a fluid flowing into or out of the structure 102, by means of transmitting thermal energy into or out of the structure 102, or within the structure 102, through the axially continuous conductive filaments 114.

In a further embodiment, the parallel passage fluid contactor structures according to the present invention may comprise anisotropic thermal conductivity in the axial direction relative to the transverse direction, due to the provision of substantially increased thermal conductivity in the axial direction by the axially continuous conductive filaments, relative to the thermal conductivity of the structure in the transverse direction. In one such embodiment, the parallel passage fluid contactor structures of the present invention may comprise anisotropic thermal conductivity where the thermal conductivity in the axial direction is at least 10 times, and more particularly at least 100 times the thermal conductivity of the structure in the transverse direction, due to the axial thermal conductivity capacity provided by the axially continuous conductive filaments included in the structure.

In a particular embodiment, the parallel passage fluid contactor structure 102 may comprise an active compound that is operable to interact with a fluid contained within or passed through the passages 110 of the parallel passage fluid contactor structure 102. For example, the cell walls 112 of the structure 102 may desirably comprise at least one active compound that is operable to interact with at least one fluid passed through the parallel fluid flow passages 110 and in contact with the cell walls 112 of the contactor. In one exemplary such embodiment, the active compound may be an adsorbent material comprised in the cell walls 112 of the contactor 102, such that when a multi-component gas mixture (an exemplary fluid) is passed through the passages 110, at least a portion of the gas mixture is adsorbed on the active adsorbent material comprised in the cell walls 112 of the contactor 102. In such embodiment, the parallel passage fluid contactor structure 102 may comprise a parallel passage adsorbent structure 102, for use in contacting a fluid such as a gas with an active adsorbent compound comprised in the cell walls 112 of the structure 102. In such embodiment, the thermally and/or electrically conductive filaments 114 within the cell walls 112 may advantageously provide for transferring thermal energy into and/or out of the adsorbent structure 102, such as to enable the use of the adsorbent structure 102 in a thermal swing adsorption process, whereby the active adsorbent material in the cell walls 112 may be heated by the thermally and/or electrically conductive filaments 114 to raise the temperature of the adsorbent material, and thereby to desorb at least a portion of an adsorbed gas. In such embodiment, any suitable known adsorbent compounds, or combinations thereof, may be comprised in the cell walls 112 of the structure 102 to enable adsorbent interaction with a gas or liquid fluid passed through the parallel fluid flow passages 110 of the structure 102.

In a second exemplary such embodiment, the active compound may be a catalyst material comprised on or in the cell walls 112 of the structure, such as by wash coating or otherwise attaching or adhering (such as by spraying or electrophoretic deposition for example) the catalyst material onto the cell walls 102, or by incorporating the catalyst material into the cell walls 112 of the structure 102, such that when a gas or liquid (exemplary fluid) is passed through the passages 110, at least a portion of the gas or liquid reacts or otherwise interacts with the active catalyst compound to result in a desired chemical reaction within the fluid contactor structure 102. In such embodiment, the parallel passage fluid contactor structure 102 may comprise a parallel passage catalyst structure 102, for use in contacting a fluid such as a gas or liquid with an active catalyst compound comprised in or on the cell walls 112 of the structure 102. In such an embodiment, the thermally and/or electrically conductive filaments 114 within the cell walls 112 may advantageously provide for transferring thermal energy into and/or out of the active catalyst material in or on the cell walls 112, such as to enable the use of the catalyst structure in a reversible catalysis process, to pre-heat or activate the catalyst material, to provide energy to initiate or sustain a catalytic reaction process, for example. In such embodiment, any suitable known catalyst compounds, or combinations thereof may be comprised in or on the cell walls 112 of the structure to enable catalyst interaction with a gas or liquid fluid passed through the passages 110 of the structure 102.

In a further such embodiment, any suitable active compound known to be operable to interact with a fluid within or passed through the passages 110 of parallel passage fluid contactor structure 102 may be comprised in or on the cell walls 112 of the structure. Exemplary such known active compounds may comprise, but are not limited to, desiccant, activated carbon, carbon adsorbent, graphite, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, uni-polar resin, bi-polar resin, aromatic cross-linked polystyrenic matrix, brominated aromatic matrix, methacrylic ester copolymer, graphitic adsorbent, carbon fiber, carbon nanotube, nano-materials, metal salt adsorbent, perchlorate, oxalate, alkaline earth metal particle, ETS, CTS, metal oxide, catalyst, chemisorbent, amine, organo-metallic reactant, and metal organic framework (MOF) adsorbent compounds, and combinations thereof.

In yet a further embodiment, the honeycomb parallel passage fluid contactor structure 102 shown in FIG. 1 may comprise an extruded honeycomb structure such as may be made by the extrusion of a ceramic or other composite slurry material through a die. In such a case, the multiple parallel passages 110 extending through the parallel passage fluid contactor structure 102 and the cell walls 112 separating adjacent passages 110 may be formed by the shape of an exemplary extrusion die, such as by an extrusion die comprising multiple spaced apart pin or rod die elements, through which a ceramic or other composite slurry may be extruded to form the structure 102. In such an embodiment, said ceramic or other composite slurry may comprise at least one inactive or structural material such as a binder material, for example, in addition to the at least one active material operable to interact with a fluid passed through passages 110 of structure 102 for example. In other embodiments, said inactive or structural material may comprise at least one of a clay, ceramic, colloid, silica, adhesive, resin, and binder compound, or combinations thereof.

According an embodiment of the invention, axially continuous thermally and/or electrically conductive filaments 114 may comprise any suitable known thermally and/or electrically conductive materials which may be drawn, shaped, formed or otherwise fashioned into a continuous filament 114. In a preferred embodiment, filaments 114 may comprise one or more materials having a desirably high thermal conductivity, in order to enable efficient conduction of thermal energy into or out of the cell walls 112 of parallel passage fluid contactor structure 102, and/or into or out of fluid passing through the passages 110 of structure 102. Exemplary such known thermally conductive materials may comprise, but are not limited to, aluminum, copper, tungsten, silver, gold and metallic alloys thereof, as well as carbon, and carbon fiber materials. Advantageously, the axially continuous conductive filaments 114 in the inventive structure 102 may be formed from suitable known materials having an axial thermal conductivity of at least 200 W/mK, and more preferably at least about 400 W/mK, in order to provide filaments 114 capable of efficiently conducting thermal energy into, out of, or within the contactor structure 102. In a particular embodiment, the axially continuous thermally and/or electrically conductive filaments 114 may comprise a thermally conductive carbon material comprising one or more of a phenolic resin carbon fiber, a mesophase carbon fiber, and a carbon nanotube material, wherein the carbon material has an axial thermal conductivity of at least 400 W/mK, and more preferably at least about 500 W//mK. In a further embodiment, the type of material and relative dimensions and spacing of the axially continuous thermally and/or electrically conductive filaments 114 may be selected so as to provide a bulk axial thermal conductivity of the entire parallel passage fluid contactor structure of at least 0.25 W/mK, and more particularly of at least about 1 W/mK. In yet a further exemplary embodiment, the type of material and relative dimensions and spacing of the axially continuous thermally and/or electrically conductive filaments 114 may be selected so as to provide a bulk axial thermal conductivity of the entire parallel passage fluid contactor structure of at least about 10 W/mK. In one exemplary embodiment where the parallel passage fluid contactor structure comprises a void fraction of about 35% and comprises conductive filaments with an axial thermal conductivity of about 600 W/mK, the structure may desirably comprise a bulk axial thermal conductivity of at least about 10 W/mK and more desirably at least about 20 W/mK, for example.

In yet another embodiment, the axially continuous thermally conductive filaments 114 running axially within contactor structure 102 may also be electrically conductive. Preferably, such electrically conductive filaments 114 may be resistively heated upon passing an electrical current through the filaments 114 in an axial direction. Therefore, electrically conductive filaments may be controllably heated or cooled by connecting the electrically conductive filaments to an electrical circuit, and controlling the passage of an electric current through the filaments to increase and/or decrease the relative temperature of the filaments 114 by means of resistive heating. This in turn provides for electrical control of heating and/or cooling of the cell walls 112 of the parallel passage fluid contactor structure 102 that are in direct contact with the filaments 114, and in turn also provides for electrical control of heating and/or cooling of one or more active compounds comprised in or on the cell walls 112 of the structure 102. Accordingly, in such an embodiment, control of electrical current flowing through the filaments 114 of the structure 102 may be used to control heating and cooling of the cell walls 112 of the structure and/or a fluid flowing through the parallel passages 110 of the structure. Electrical resistance heating of the filaments 114 may therefore be used to heat an active compound in or on the cell walls 112, such as to desorb a portion of an adsorbed gas from an adsorbent active compound, or to desorb a portion of an absorbed gas or liquid from an absorbent or chemi-sorbent active compound, or to activate an active compound, or provide thermal energy for a catalytic or other chemical reaction, for example.

In a further embodiment, the parallel passage fluid contactor structure 102 may also comprise thermally and/or electrically conductive filaments oriented in a transverse direction and extending transversally across the structure 102. Such transverse filaments may preferably be embedded in or otherwise situated within the cell walls 112 of the structure 102, such as to provide thermal conductivity capacity to the structure 102 in a transverse direction. Such transverse conductive filaments may also be both thermally and electrically conductive, and operable to be heated by electrical resistance heating upon passing a current through the transverse filaments, similar to the axially continuous filaments 114 described above.

Additionally, it should be noted that for all embodiments of the present invention, the relative dimensions of the parallel fluid flow passages 110, cell walls 112 and axially continuous thermally conductive filaments 114 may be adapted to suit the desired characteristics of the structure 102 for any desired application or use, such as desired characteristics for fluid flow including pressure drop, characteristics for structural integrity and strength, porosity and/or void ratio for the structure 102, thermal capacity and/or mass of the structure, and axial thermal conductivity provided by filaments 114 for example, among other potentially desired characteristics.

Figure 3:
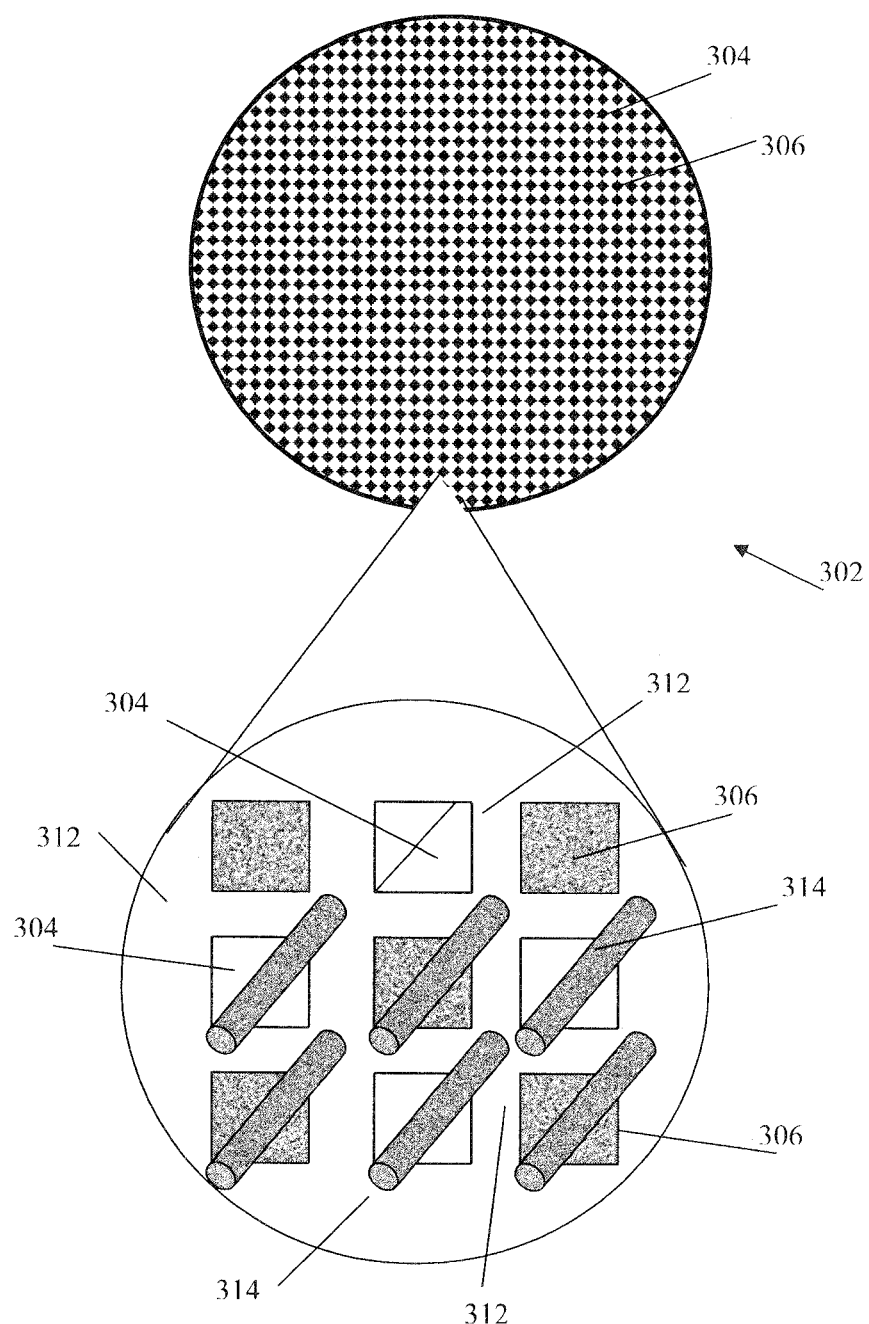
FIG. 3 illustrates a cross-sectional view of a parallel passage fluid contactor structure according to a further embodiment of the invention.

Referring now to FIG. 3, a cross sectional view of a parallel passage fluid contactor structure 302 according to another embodiment of the present invention is shown. The parallel passage fluid contactor structure 302 comprises an exemplary honeycomb structure comprising parallel fluid flow passages 304 separated by cell walls 312. Similar to the structure 102 shown in FIGS. 1 and 2, the honeycomb structure 302 also comprises axially continuous thermally and/or electrically conductive filaments 314 embedded in or otherwise located within cell walls 312, to provide axial thermal conductivity capacity to the honeycomb structure 302. In the exemplary parallel passage fluid contactor structure 302 at least a portion of the parallel fluid flow passages 304 are blocked at one end of the structure 302 by a plug or cap 306, which blocks fluid from flowing in or out of the parallel passage 304 at the blocked end of the structure. Preferably any one passage 304 is only blocked by plug or cap 306 at one end of the structure 302, to provide for flow of fluid into or out of the particular passage 304 at the other unblocked end. Additionally, it is preferable that at least a portion of the cell walls 312 between flow passages 304 are at least partially porous, such that a fluid (such as a liquid or gas) can pass through such porous cell wall portions 312. In such a manner, fluid may be passed into the passage 304 at a first unblocked end of the structure and by means of the plug or cap 306 blocking the other end of the passage 304, the fluid can be made to pass through a porous portion of the cell wall 312 adjacent to the blocked passage and into another neighbouring passage 304.

In a particular embodiment, the honeycomb parallel passage fluid contactor structure 302 may preferably comprise plugs or caps 306 blocking alternating fluid passages at either end of the structure 302 as illustrated in FIG. 3, so that each individual fluid passage 304 is blocked at one end of the structure 302 and open at the other end of the structure 302, and also so that each passage 304 is adjacent to flow passages that are blocked at their opposite ends. The cell walls 312 of such a structure 302 are also at least partially porous so as to be pervious to a fluid such as a gas or liquid flowing through the cell wall portions 312 between passages 304. Accordingly, a fluid may be passed into the contactor structure 302 at a first end into the passages 304 that are open at that first end and blocked at a second end of the structure 302, and such fluid may be made to flow through the cell walls 312 between passages 304, to exit the contactor structure through the alternating passages 304 that are blocked at the first end and open at the second end of the structure 302, thus providing a wall flow parallel passage contactor structure also having axially continuous thermally conductive filaments 314 located within the cell walls 312. In a preferred embodiment, the wall flow structure 302 also comprises at least one active compound in and/or on the cell walls 312 of the structure 312, as described above, so that a fluid passed through the contactor structure 302 and thereby flowing through the cell walls 312 of the structure 302 will also pass in intimate contact with the at least one active compound comprised in or on the cell walls 112.

In one example, a parallel passage wall flow fluid contactor structure 302 may comprise an active adsorbent compound in or on the cell walls 312 of the structure 302 such that when a gas mixture is passed through the structure 302 it flows through cell walls 312 and in intimate contact with the adsorbent compound, such that a portion of the gas is adsorbed on the adsorbent. Subsequently, following the adsorption of a portion of the gas mixture on the adsorbent compound comprised in or on the cell walls 312, thermal energy may be transmitted into the structure 302 by the axially continuous thermally and/or electrically conductive filaments 314, providing thermal energy to desorb at least a portion of the adsorbed gas from the adsorbent compound. In such a manner, the parallel passage wall flow adsorbent structure 302 may be used to implement a temperature swing adsorption/desorption process such as for separating components of a gas mixture, for example. Additionally, axially continuous thermally conductive filaments 314 may provide for control of the thermal conditions and profile within adsorbent structure 302 during adsorption and desorption of gas mixture components, such as to enhance the adsorption/desorption process by transmitting thermal energy from one end of the structure 302 to the other end to reduce the thermally transient effects of the adsorption front or desorption front during use of the structure 302 in an adsorptive gas separation process, for example.

Figure 4:
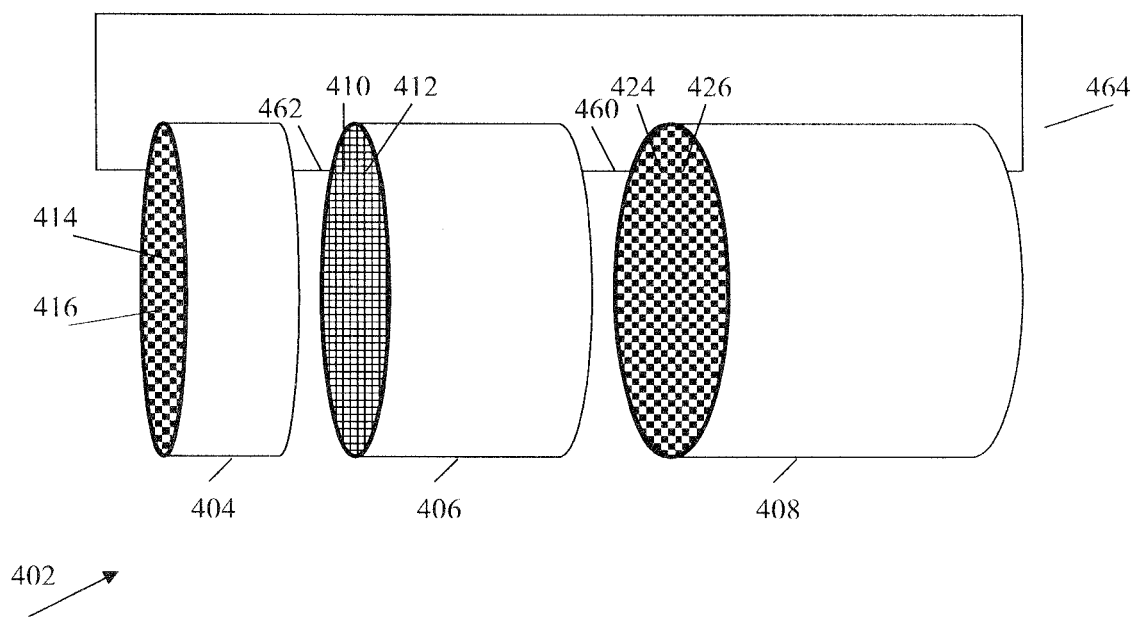
FIG. 4 illustrates a perspective view of a parallel passage fluid contactor structure comprising multiple segments according to an embodiment of the invention.

Referring now to FIG. 4, a partially exploded perspective view of a parallel passage fluid contactor structure 402 comprising multiple segments is shown, according to an embodiment of the invention. Multiple individual parallel passage segments, such as segments 404, 406 and 408, may be fluidly connected in series to form a single multi-segment structure 402. Each parallel passage segment comprised in the multi-segment structure comprises a plurality of parallel fluid flow passages, cell walls separating such passages, and axially continuous thermally and/or electrically conductive filaments embedded within or otherwise located in the cell walls, in accordance with embodiments of the present invention. Each parallel passage segment also preferably comprises at least one active compound in or on the cell walls of the segment structure, so as to enable interaction between the active compound and a fluid passed through the parallel passage fluid contactor segment. However, individual parallel passage segments may include different physical specifications such as relative size, space and orientation of parallel fluid passages, cell walls and thermally conductive filaments, different axial lengths, different active compounds or combinations thereof in or on the cell walls of the segment, or different non-active materials used in the construction of the segment, as may be suitable for use of the multi-segment parallel passage fluid contactor structure for a desired application or purpose.

In one exemplary embodiment, as shown in FIG. 4, the multi-segment parallel passage fluid contactor structure 402 may comprise a first parallel passage fluid contactor segment 404 which comprises a wall flow parallel passage segment, similar to as described above in reference to FIG. 3, wherein the first wall flow parallel passage segment 404 comprises blocked parallel passages 414 which are blocked at a first end of the segment 404, and alternating adjacent open parallel passages which are open at the first end of the segment 404 but blocked at a second end of the segment 404. Wall flow parallel passage segment 404 also comprises cell walls (not indicated) between the parallel passages, and axially continuous thermally and/or electrically conductive filaments (not shown) embedded in the cell walls and extending axially through segment 404, as described above in reference to FIG. 3. Further, first wall flow parallel passage segment 404 comprises at least one first active compound in or on the cell walls, such as a first adsorbent compound, which may comprise an exemplary alumina based adsorbent, for example. The multi-segment contactor structure 402 also comprises a second parallel passage fluid contactor segment 406, which is similar to as described above in reference to FIGS. 1 and 2, comprising parallel fluid flow passages 410 and cell walls 412 between flow passages 410. Segment 406 also comprises axially continuous thermally and/or electrically conductive filaments (note shown) embedded in the cell walls 412 and extending axially through segment 406. Second segment 406 also comprises at least a second active compound in or on the cell walls 412, such as a second adsorbent compound, which may comprise an exemplary silica based adsorbent, for example. The multi-segment contactor structure 402 also comprises a third wall flow parallel passage segment 408, similar to as described above in reference to FIG. 3, comprising blocked parallel passages 424 which are blocked at a first end of segment 408 and open at a second end, and alternating adjacent open parallel passages 426 which are open at the first end of the segment 408, but blocked at the second end. Wall flow segment 408 also comprises cell walls between parallel passages and axially continuous thermally and/or electrically conductive filaments (not shown) embedded in the cell walls and extending axially through segment 408, and additionally comprises at least a third active compound in or on the cell walls, such as a third adsorbent compound, which may comprise an exemplary zeolite based adsorbent, for example. Accordingly, the exemplary multi-segment parallel passage adsorbent structure 402 comprises all three segments 404, 406 and 408 fluidly connected in series so that a gas mixture may be passed sequentially through the three segments and portions of the gas mixture may be adsorbed on each of the first, second and third active adsorbent compounds. Such an exemplary multi-segment structure may be used to implement a temperature swing adsorptive separation process, for example, to separate multiple components of a gas mixture, where the desorption and/or regeneration of the segments 404, 406 and 408 of the multi-segment structure 402 may be effected through the application of thermal energy to the segments 404, 406 and 408 via the axially continuous thermally and/or electrically conductive filaments extending through each of the segments. Such temperature (or thermal) swing adsorptive regeneration may be applied to all of segments 404, 406, and 408 simultaneously, or alternatively may be applied individually or in any desired sequence, so as to provide independent control of regeneration of each of segments 404, 406 and 408, as may be desirable to implement different adsorptive separation processes and/or cycles, such as may be preferred for complex and/or multi-component separations, for example.

The multi-segment parallel passage fluid contactor structure 402 may also desirably comprise a thermal conductive circuit connecting the conductive filaments of the individual parallel passage segments 404, 406 and 408, such as is schematically represented by thermally conductive connection 462 between first segment 404 and second segment 406, thermally conductive connection 460 between second segment 406 and third segment 408, and thermally conductive connection 464 between third segment 408 and first segment 404. In particular, the thermally conductive connections 462, 460 and 464 preferably connect at least a portion of the conductive filaments extending axially through the segments 404, 406 and 408, so that thermal energy may be transmitted between segments within the multi-segment structure 402. Alternatively, connection 464 may also be used to connect the thermally conductive filaments of the multi-segment structure 402 to an external thermal source and/or sink, to facilitate the transmission of thermal energy into and/or out of the structure 402, and by connection into and/or out of each of segments 404, 406 and 408. According to one exemplary embodiment, thermally conductive connections 462, 460 and 464 may be made with the thermally conductive filaments in segments 404, 406 and 408 by bundling and/or otherwise mechanically (such as by bonding and/or soldering for example) connecting the filaments from each segment together, so that they are in intimate and thermally conductive contact with each other, and can transmit thermal energy between segments. Alternatively, any other suitable means of thermally connecting the filaments in connected segments may be used. In a further embodiment, each of segments 404, 406 and 408 may be independently thermally connected to an outside thermal source and/or sink, rather than connected to another segment, so that thermal energy may be transmitted into and/or out of each segment individually.

In alternative embodiments, segments 404, 406 and 408 may comprise any suitable active compound in or on the cell walls of the segment as may be desirable for use an a desired application, such as but not limited to adsorption, absorption, chemi-sorption, reaction or catalysis processes, for example, and including, but not limited to the active compounds described above in reference to FIGS. 1 and 2 or combinations thereof. Further, multi-segment structures may comprise any suitable number of parallel passage segments as may be desirable for use in a desired application, and each such segment may comprise active compounds and physical specifications similar to or different from any other segment in the multi-segment structure.

Figure 5:
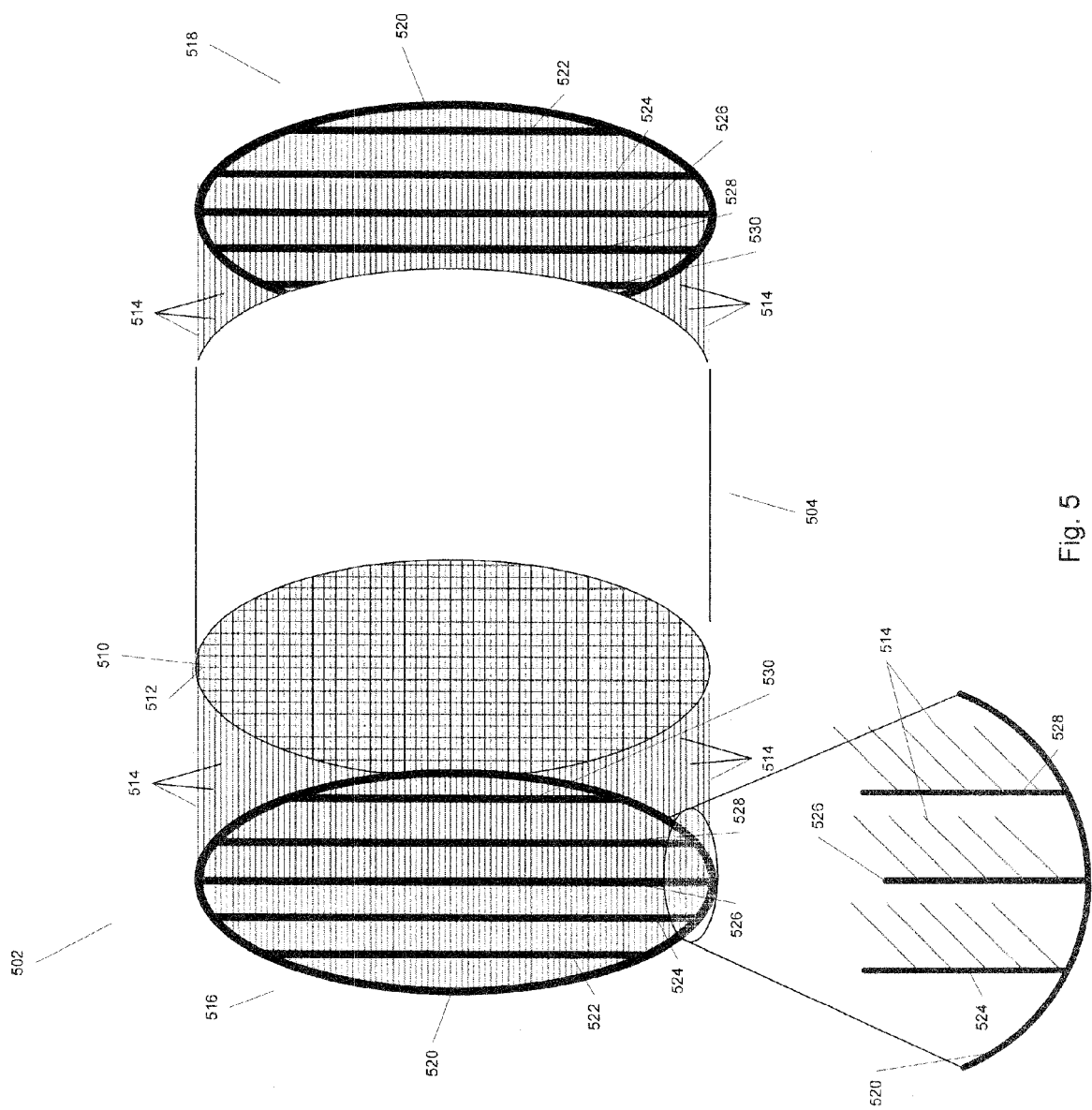
FIG. 5 illustrates an exploded perspective view of a parallel passage fluid contactor structure according to an embodiment of the invention.

Referring now to FIG. 5, an exploded perspective view of a parallel passage fluid contactor structure 502 is shown, according to an embodiment of the invention. Similar to as described above in reference to FIGS. 1 and 2, the parallel passage fluid contactor structure 502 comprises parallel fluid flow passages 510 and cell walls 512 between adjacent passages 510, arranged in an exemplary honeycomb configuration. Structure 502 also comprises axially continuous thermally and/or electrically conductive filaments 514 embedded in or otherwise located in cell walls 512, and extending the axial length of the structure 502 from a first end to a second end of the structure. Structure 502 also comprises filament connector elements 516 and 518 located at first and second ends of the structure 502 to connect individual conductive filaments 514 of the structure 502 together, and to a thermal and/or electrical circuit inside or outside of the structure 502. Each filament connector element 516, 518 is at least thermally or electrically conductive and comprises multiple grid elements 522, 524, 526, 528, 530 and a peripheral element 520 connecting the grid elements. The individual axially continuous conductive filaments 514 are connected to the filament connector elements 516 and 518 at either end of the structure 502. Accordingly, the filament connector elements 516 and 518 may be connected to a thermally conductive circuit, such as a thermal source and/or sink, to transmit thermal energy into and/or out of the thermally conductive filaments of structure 502, and therefore to transmit thermal energy into and/or out of the cell walls 512 and passages 510 of the structure 502.

In one embodiment, the grid elements 522, 524, 526, 528 and 530 of filament connector elements 516 and 518 may be substantially aligned with the orientation of the cell walls 512 and thermally conductive filaments 514 embedded in cell walls 512, to facilitate connection with the thermally conductive filaments 514 of structure 502. Accordingly, depending on the orientation of the cell walls 512 and filaments 514 of the structure 502, grid elements 522, 524, 526, 528, 530 of connector elements 516, 518 may be oriented vertically as shown in FIG. 5, or horizontally, or in another orientation to facilitate connection with filaments 514. The connection of filaments 514 to connector elements 516, 518 may be made by any suitable thermally conductive connection means, such as by bonding, soldering, friction fit, or mechanical socket connection, for example.

In a further embodiment, axially continuous thermally conductive filaments 514 are preferably also electrically conductive, and may be resistively heated upon passing an electrical current through the filaments 514 in an axial direction. In such embodiment, the filament connection elements 516 and 518 are also preferably electrically conductive and are connected by an electrically conductive means to filaments 514. Filament connective elements 516 and 518 may thereby be connected to an electrical circuit to conduct electrical current through the filaments 514 of parallel passage fluid contactor structure 502. Therefore, the filaments 514 may be controllably heated or cooled by connecting the filament connector elements 516, 518 to an electrical circuit, and controlling the passage of an electric current through the filaments 514 to increase and/or decrease the relative temperature of the filaments 514 by means of resistive heating. This in turn provides for electrical control of heating and/or cooling of the cell walls 512 of the parallel passage fluid contactor structure 502 that are in direct contact with the filaments 514, and in turn also provides for electrical control of heating and/or cooling of one or more active compounds comprised in or on the cell walls 512 of the structure 502. Electrical resistance heating of the filaments 514 may therefore be used to heat an active compound in or on the cell walls 512, such as to desorb a portion of an adsorbed gas from an adsorbent active compound, or to desorb a portion of an absorbed gas or liquid from an absorbent or chemi-sorbent active compound, or to activate an active compound, or provide thermal energy for a catalytic or other chemical reaction, for example.

Figure 6:
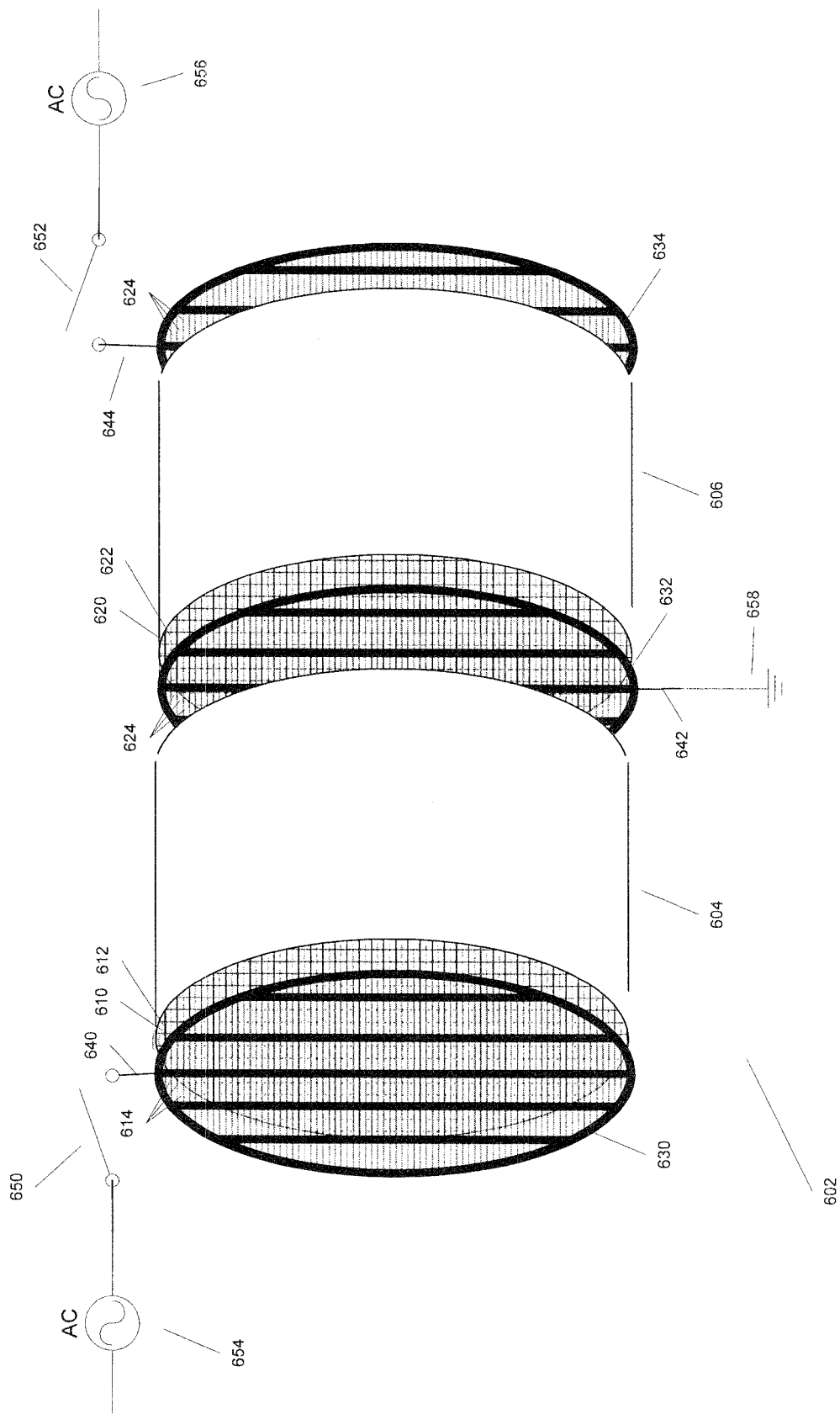
FIG. 6 illustrates an exploded perspective view of a parallel passage fluid contactor structure comprising multiple segments according to an embodiment of the invention.

Referring now to FIG. 6, an exploded perspective view of a parallel passage fluid contactor structure 602 comprising multiple segments is shown, according to an embodiment of the invention. Multi-segment parallel passage fluid contactor structure 602 comprises first and second parallel passage fluid contactor segments 604 and 606 respectively which are fluidly connected together in series to enable a fluid to be passed through segments 604 and 606 sequentially, although in alternative embodiments, any suitable number of segments may be included in the structure 602 as may be suited to a desired application or use. Parallel passage fluid contactor segments 604 and 606 each comprise an exemplary honeycomb configuration similar to as described above in reference to FIG. 5, with segment 604 comprising parallel fluid flow passages 610 and cell walls 612 between adjacent passages, and segment 606 comprising passages 620 and cell walls 622, respectively. Segment 604 also comprises axially continuous thermally and/or electrically conductive filaments 614 embedded in or otherwise situated within cell walls 612 and extending axially through segment 604, and similarly segment 606 comprises axially continuous thermally and/or electrically conductive filaments 624 embedded in or otherwise situated within cell walls 622 and extending axially through segment 606. Each of parallel passage fluid contactor segments 604 and 606 also desirably comprise at least one active compound in or on cell walls 612 and 622, respectively, where each active compound is operable to interact with a gas and/or liquid fluid passed through the structure 602. In one exemplary embodiment, segment 604 may comprise a first active adsorbent compound, and segment 606 may comprise a second active adsorbent compound, for example, to provide a multi-adsorbent parallel passage adsorbent structure 602, such as may be suitable for use in a thermal swing adsorptive separation process, for example. In another exemplary embodiment, segments 604 and 606 may each comprise other different active compounds, such as may be suitable for use in other fluid contact processes such as absorption, reaction and/or catalysis, for example, similar to as described above with reference to FIGS. 1 and 2. In a further embodiment, segments 604 and 606 may optionally comprise the same active compound if desired.

In the exemplary embodiment shown in FIG. 6, conductive filaments 614 and 624 are both thermally and also electrically conductive, and may be heated by means of electrical resistance heating upon passage of an electrical current through conductive filaments 614, 624 in an axial direction. Conductive filaments 614 are electrically connected to electrically conductive filament connector elements 630 and 632 at first and second ends of parallel passage fluid contactor segment 604, to enable electrical connection of filaments 614 to an electrical circuit. Accordingly, conductive filaments 614 and thereby also cell walls 612 and adjoining passages 610 may be controllably heated by passing a controllable electrical current through filaments 614. Similarly, in segment 606, conductive filaments 624 are electrically connected to electrically conductive filament connector elements 632 and 634 at first and second ends of segment 606, to enable electrical connection of filaments 624 to an electrical circuit and controllable heating of filaments 624 and thereby also cell walls 622 and passages 620 by passing a controllable electrical current through filaments 624. In an alternative embodiment, filaments 614 of segment 604 and filaments 624 of segment 606 may be connected to separate filament connector elements, rather than common connector element 632, however for simplicity, in the embodiment shown in FIG. 6, common filament connector element 632 is employed, which may be connected to a common ground 658 of an electrical circuit via electrical connection 642.

As shown in the exemplary embodiment of FIG. 6, multi-segment parallel passage fluid contactor structure 602 is connected to a controllable electrical circuit, to provide electrical control of the heating and/or cooling of filaments 614 and 624 of contactor segments 604 and 606. Electrical connection 640 of the filament connector element 630 at the first end of segment 604 may be controllably electrically connected to electrical power source 654 by switch means 650. Similarly, electrical connection 644 of the filament connector element 634 at the second end of segment 606 may be controllably electrically connected to electrical power source 656 by switch means 652. As previously described, electrical connection 642 of filament connector element 632 is connected to common electrical ground 658, providing a ground connection for filaments 614 and 624. Accordingly, switch means 650 and 652 may be operated to independently control electrical current to filaments 614 of segment 604 and filaments 624 of segment 606, respectively, to provide independently controllable heating and/or cooling of segments 604 and 606 by electrical means. This independent electrical control of the temperature of segments 604 and 606 of multi-segment structure 602 may be desirably used to control one or more reaction processes within structure 602.

In one example, in the case where structure 602 is a multi-segment adsorbent structure with segments 604 and 606 comprising first and second adsorbent compounds, the adsorption and desorption on the adsorbents of segments 604 and 606 of components of a gas mixture passed through structure 602 may be independently electrically controlled. This may desirably provide improved control and performance of thermal swing adsorption processes using exemplary structure 602, so that desorption and/or regeneration of one adsorbent segment 604 may be achieved independently of the other adsorbent segment 606, for example.

In another example, in the case where structure 602 is a multi-segment catalytic structure with segments 604 and 606 comprising first and second catalytic compounds, the catalytic reaction of components of a gas mixture passed through structure 602 in segments 604 and 606 may be independently electrically controlled. This may desirably provide improved control and performance of multi-reaction catalysis processes using exemplary structure 602, so that reaction temperature and/or regeneration of one catalytic segment 604 may be controlled independently of the other catalytic segment 606, for example.

In a further example, a single segment parallel passage contactor structure may comprise a single set of axially continuous conductive filaments, but may comprise two or more sections of active compounds applied to and/or incorporated in the single structure segment. For example, a single segment may comprise first and second axial sections where cell walls comprise first and second active compounds such as adsorbent materials. Alternatively, a single segment structure may comprise first and second active compounds applied to at least a portion of the cell wall surfaces of first and second axial sections of the structure, such as first and second catalytic active compounds applied to the structure adjacent to first and second ends of the structure segment. In such an example, a first active compound (such as a first catalyst) may be applied to a first section of the structure segment such as by wash coating, spraying, impregnation, grafting or any other suitable method of application, while a second active compound (such as a second catalyst) may be similarly applied to a second section of the structure segment by any suitable means, to provide a single structure segment comprising two or more sections each comprising at least one active compound. Accordingly, in such an embodiment, the entire structure segment may be heated and/or cooled by means of the axially continuous conductive filaments therein to simultaneously heat and/or cool each of the two or more sections of active compounds.

Figure 7:
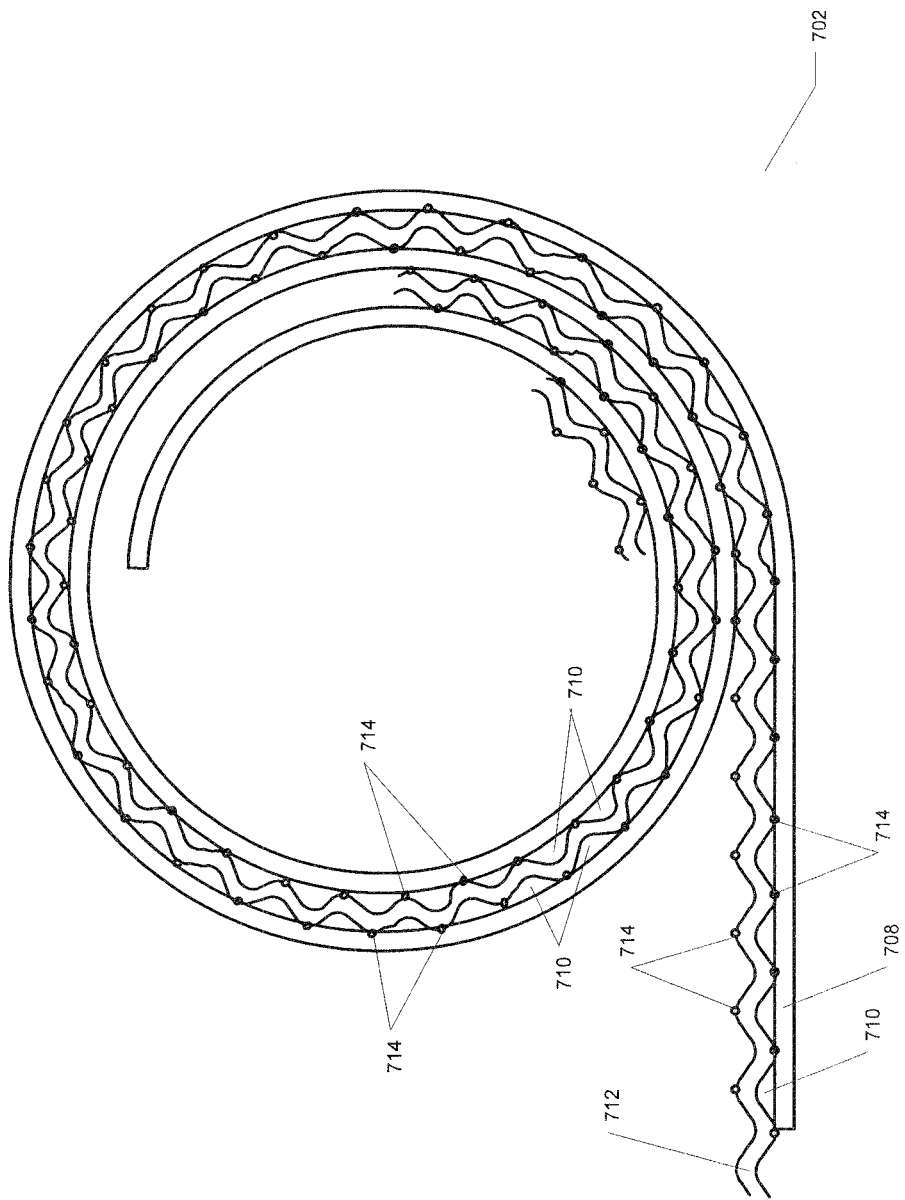
FIG. 7 illustrates a perspective cross-sectional view of a corrugated parallel passage fluid contactor structure according to an embodiment of the invention.

Referring now to FIG. 7, a perspective cross-sectional view of a corrugated parallel passage fluid contactor structure 702 is shown, according to an embodiment of the invention. Corrugated parallel passage fluid contactor structure 702 comprises first and second cell wall layers 708 and 712, respectively. First cell wall layer 708 comprises a substantially planar layer upon which second corrugated cell wall layer 712 is supported. Second cell wall layer 712 may be typically arranged in regular wave-like ridges common to corrugated structures, such that passages 710 are created between the first cell wall layer 708 and second cell wall layer 712. Accordingly, corrugated first and second cell wall layers 708 and 712 may be rolled into a concentric substantially cylindrical shape to form corrugated structure 702, which comprises substantially parallel fluid flow passages 710 oriented in an axial direction. Corrugated structure 702 further comprises axially continuous thermally and/or electrically conductive filaments 714 which may embedded in or otherwise situated within the first and/or second cell wall layers 708 and 712, such as at the intersection of layers 708 and 712 between passages 710. Therefore, as corrugated structure 702 is assembled, filaments 714 are oriented axially within structure 702, extending from a first end to a second end of the structure 702, and provide thermal conductivity capacity in an axial direction.

Similar to as described above in reference to FIGS. 1 and 2, axially continuous thermally conductive filaments 714 of corrugated structure 702 may desirably be used to conduct thermal energy into or out of the structure 702, and at least a portion of the axially continuous thermally conductive filaments 714 of structure 702 may desirably be thermally connected to a source or sink of thermal energy, in order to conduct thermal energy into or out of the structure 702. Such thermal energy conducted into or out of the structure 702 may desirably increase or decrease the temperature of cell walls 708, 712, and/or may transfer thermal energy into or out of a fluid within the passages 710 of the corrugated fluid contactor structure 702.

Also similar to as described above in reference to FIGS. 1 and 2, corrugated parallel passage fluid contactor structure 702 may comprise at least one active compound operable to interact with a fluid contained within or passed through the passages 710 of the structure 702. For example, the cell walls 708, 712 of the structure 702 may comprise at least one active adsorbent compound in or on the cell walls 708, 712 such that when a multi-component gas mixture (an exemplary fluid) is passed through the passages 710, at least a portion of the gas mixture is adsorbed on the active adsorbent material comprised in or on cell walls 708, 712.

Further, similar to as described above in reference to other embodiments, the axially continuous thermally conductive filaments 714 of corrugated structure 702 may also be electrically conductive and may be resistively heated upon passing an electrical current through the filaments 714 in an axial direction. Therefore, electrically conductive filaments 714 may be controllably heated or cooled by connecting the electrically conductive filaments 714 to an electrical circuit, and controlling the passage of an electric current through the filaments 714. This in turn provides for electrical control of heating and/or cooling of the cell walls 708, 712 of the corrugated structure 702 and thereby also of one or more active compounds comprised in or on the cell walls 708, 712 of the structure 702.

Figure 8:
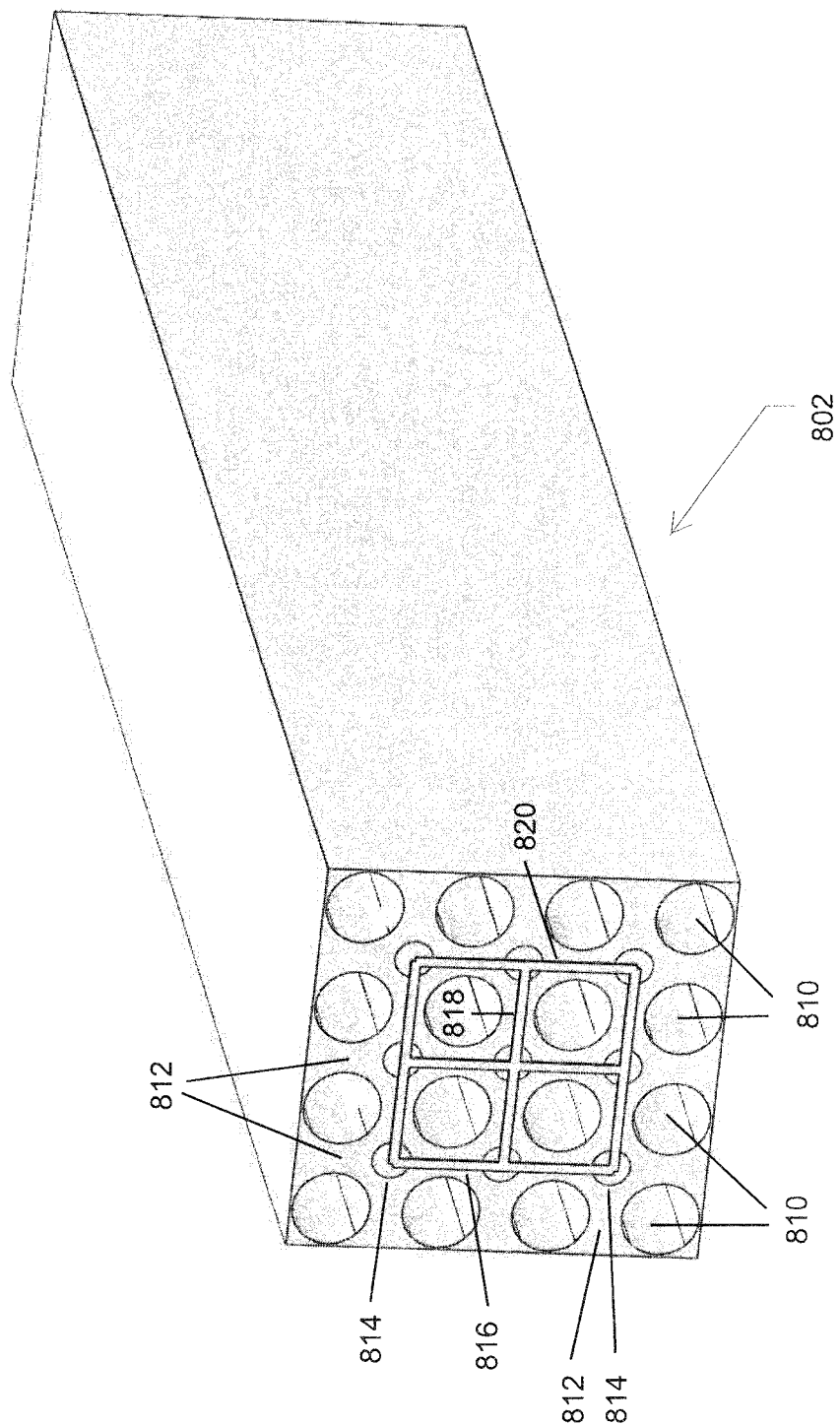
FIG. 8 illustrates a perspective view of a parallel passage fluid contactor structure segment according to an embodiment of the invention.

Referring now to FIG. 8, a perspective view of a further parallel passage fluid contactor structure segment 802 is shown, according to an embodiment of the invention. Parallel passage fluid contactor structure segment 802 is substantially similar to other honeycomb configured parallel passage fluid contactor structure embodiments as described above in reference to FIGS. 1, 2, 5 and 6, however, exemplary structure segment 802 comprises multiple substantially parallel fluid flow passages 810 which have substantially circular cross sections, and are substantially cylindrical in shape. Additionally exemplary structure segment 802 also comprises a substantially rectangular outer shape, which may be desirable for some applications for reasons of fit or ease of manufacturing, for example. Structure segment 802 also comprises cell walls 812 between cylindrical flow passages 810, and axially continuous thermally and/or electrically conductive filaments 814 embedded in or otherwise situated within the cell walls 812. In the exemplary structure segment 802, conductive filaments 814 are thermally connected to each other by means of a thermally conductive connector grid, comprising exemplary horizontal elements 818 and vertical elements 816, and such thermally conductive connector grid may be used to connect filaments 814 to an external thermal energy source and/or sink, as described above in reference to FIGS. 1 and 2.

Figure 9:
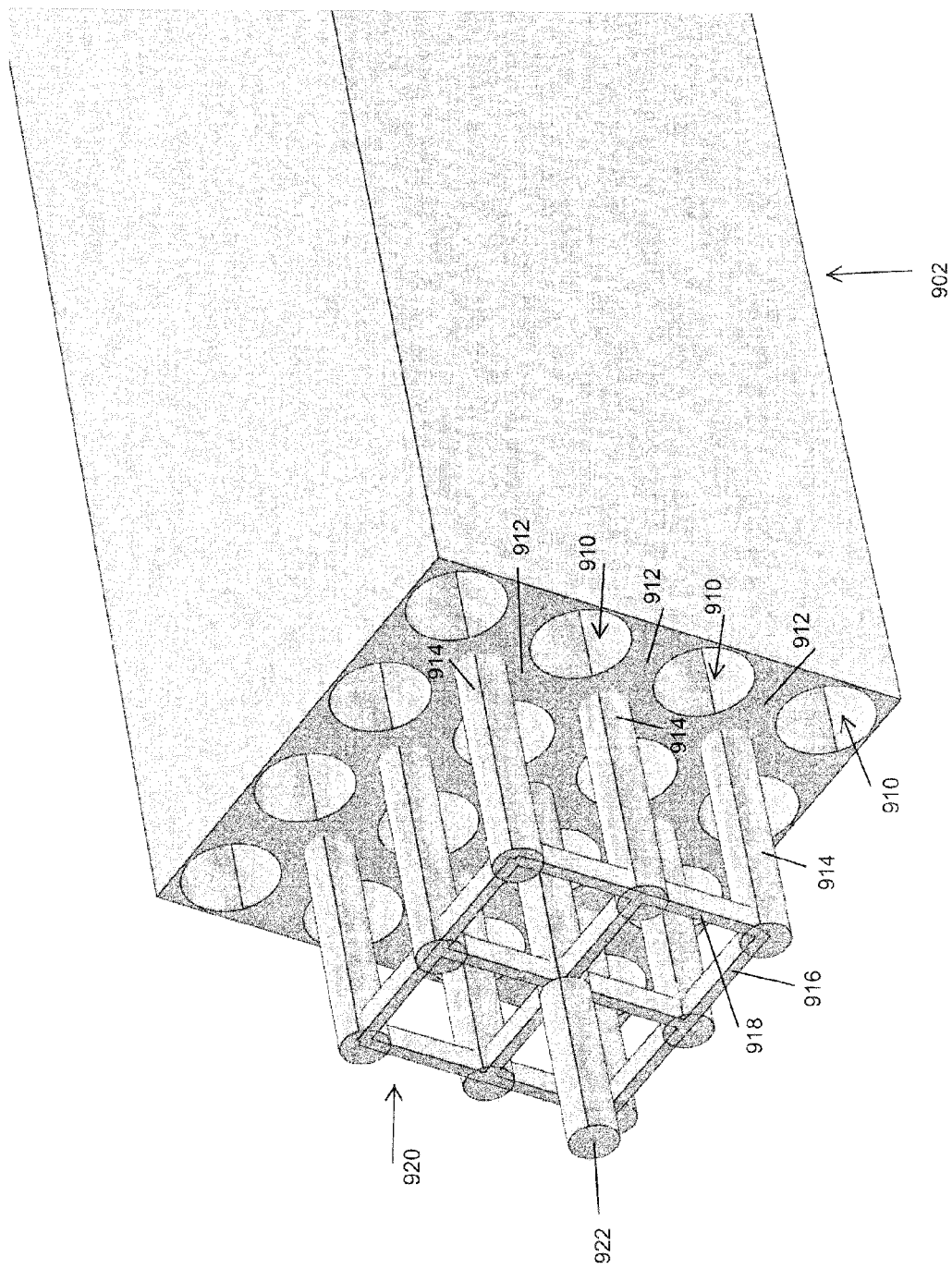
FIG. 9 illustrates a partially exploded perspective view of a parallel passage fluid contactor structure segment according to a further embodiment of the invention.

Referring now to FIG. 9, a partially exploded perspective view of a parallel passage fluid contactor structure segment 902 is shown, according to a further embodiment of the invention. Structure segment 902 represents a partially exploded view of substantially the same exemplary structure segment illustrated as segment 802 in FIG. 8 above. Accordingly, segment 902 comprises substantially parallel fluid passages 910 separated by cell walls 912, and axially continuous thermally and/or electrically conductive filaments 914 embedded in or otherwise situated within cell walls 912. Filaments 914 are also connected by grid connector elements 918 and 916. The structure segment 902 additionally also comprises a central connector element 922 which may be used to connect filaments 914 to an external thermal circuit. Additionally, in the case where filaments 914 and connector elements 916, 918 and 922 are both thermally and additionally electrically conductive, connector element 922 may be used to electrically connect filaments 914 of structure segment 902 to an electrical circuit, to provide electrical control of heating of the segment 902, such as may be desirable for controlling adsorption, absorption, reaction and/or catalysis processes within the structure segment, for example.

Figure 10:
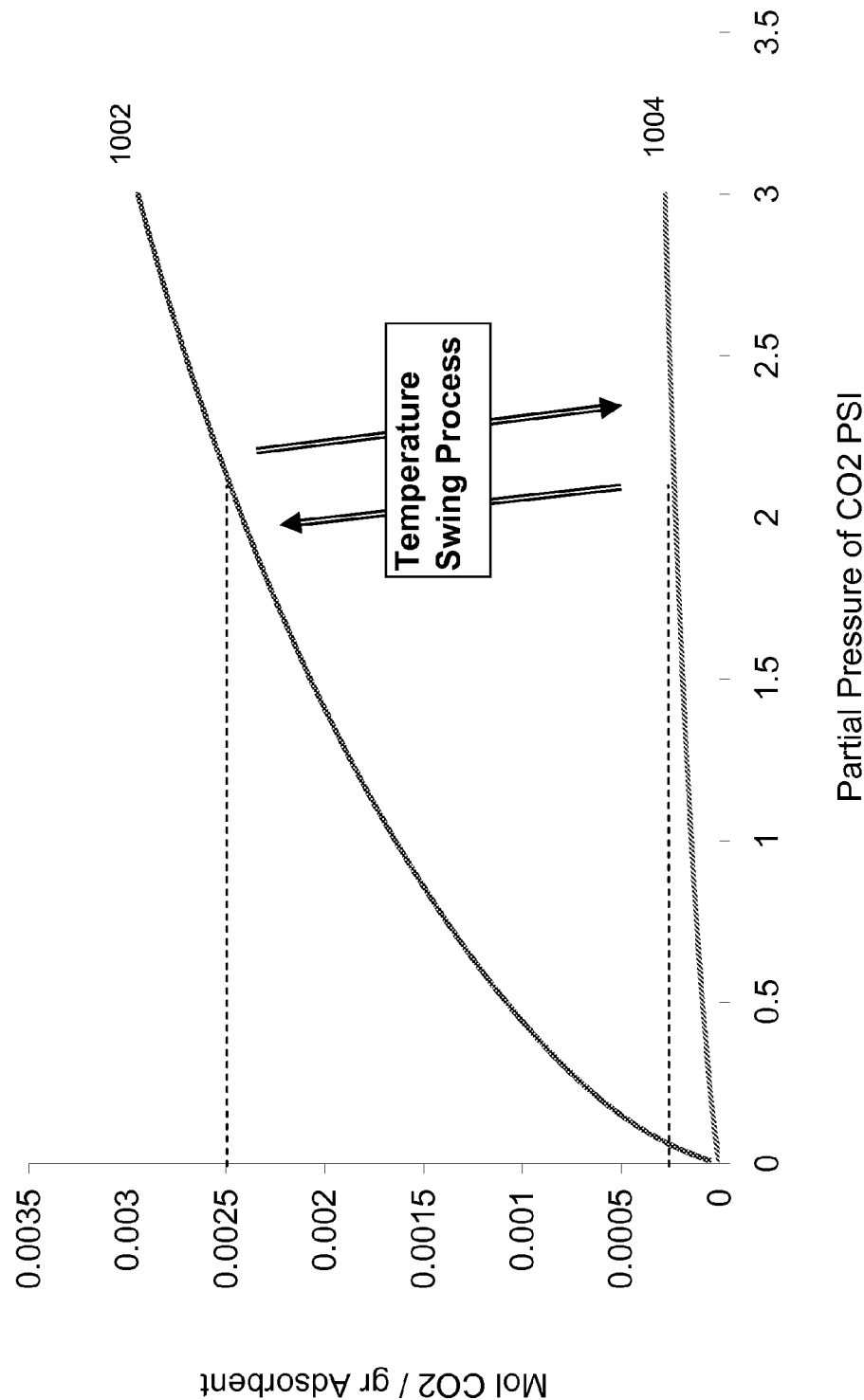
FIG. 10 illustrates an exemplary adsorption isotherm for a temperature swing adsorption process used in conjunction with a parallel passage fluid contactor structure according to an embodiment of the invention.

Referring now to FIG. 10, exemplary adsorption isotherms 1002, 1004 for a temperature swing adsorption process used in conjunction with a parallel passage fluid contactor structure are shown, according to an embodiment of the invention. As described above, particularly in reference to FIGS. 1 and 2, parallel passage fluid contactor structures according to some embodiments of the present invention may desirably comprise active adsorbent compounds in the cell walls of the structure, and may be used to conduct adsorption processes such as thermal swing adsorption for the separation of components of a gas mixture. Adsorption isotherm 1002 represents the adsorption of an exemplary gas component such as carbon dioxide on an exemplary adsorbent compound at a first relatively lower temperature. Adsorption isotherm 1004 represents the relatively decreased adsorption of the same exemplary gas component on the exemplary adsorbent compound at a second, relatively higher temperature. As can be seen and is well known in the art, it is possible to exploit the difference in adsorption capacities of the exemplary adsorbent compound to adsorb a desired exemplary gas component at a first lower temperature, to separate it from a gas mixture, and then to desorb a substantial portion of the adsorbed gas component by raising the temperature of the adsorbent compound. Accordingly, the above-described exemplary embodiments of parallel passage fluid contactor structures comprising axially continuous thermally and/or electrically conductive filaments operable to heat the contactor structure independent of the temperature of a fluid within the flow passages of the structure may desirably provide an improved means for conducting thermal swing adsorption processes without requiring the use of heated fluid flows within the structure to effect temperature changes in the adsorbent compound, for example, or to reduce the reliance upon thermal transfer between fluid flows and the structure to conduct thermal swing adsorption processes.

According to another aspect of the present invention, a method of manufacturing a parallel passage fluid contactor structure comprising axially continuous thermally and/or electrically conductive filaments is disclosed. In one embodiment, a honeycomb parallel passage fluid contactor structure such as described above in reference to FIGS. 1 and 2 may be manufactured by extruding a precursor slurry of the material comprising the fluid contactor structure through an extrusion die, for example. In such an embodiment, a slurry comprising at least one structural compound of the structure is provided for extrusion, such as a wet or paste-like slurry comprising a ceramic structural material, for example. The slurry may also desirably possess shear-thinning rheological properties, to facilitate extrusion through a die, while desirably providing structural integrity following extrusion. Exemplary structural compounds may comprise clay, ceramic, colloid, silica, adhesive, resin, and binder compounds, or combinations thereof. The slurry may also comprise at least one active compound to be incorporated into the fluid contactor structure, such as one or more of the exemplary types of active compounds described above in reference to FIG. 1, for example. In one embodiment, the structural compound may also be an active compound, such as an adsorbent clay compound, for example.

A suitable such slurry may then be extruded through a die in an axial direction, to simultaneously form a honeycomb configuration comprising multiple axially oriented parallel fluid flow passages divided by cell walls extending between the fluid flow passages, to form a green parallel passage fluid contactor structure. In one embodiment, the die may comprise a network of shallowly-cut grooves in the face of the die, which are arranged in a regular grid pattern to form the honeycomb cell wall network of the parallel passage contactor structure when the slurry is extruded through the grooves. The relative size and spacing of the grooves in the face of the die may be selected according to any suitable desired dimensions and spacing of the cell walls and parallel fluid flow passages of the resulting parallel passage fluid contactor structure segment, allowing for any potential contraction or shrinkage during drying, curing, firing and/or activation of the structure segment. In a particular embodiment, the network of shallowly-cut grooves in the face of the die may be connected to a source of the slurry by a plurality of small feed holes in the back of the die such that the slurry may be supplied under a controllable extrusion pressure through the feed holes to be extruded through the network of grooves. Each groove may be supplied with slurry by one or more feed holes, depending on factors such as the relative dimensions of the grooves in relation to the consistency of the slurry, for example.

Axially continuous thermally and/or electrically conductive filaments may be fed through a plurality of feed holes that are aligned to supply slurry to the intersections of the shallow grooves in the face of the die, so that the filaments may extend through the intersections of the grooves as the slurry is extruded through the die to form the fluid contactor structure segment. Accordingly, as the slurry is extruded through the die, the filaments are extended through the die along with the slurry and are embedded in the cell walls of the green structure segment extending axially through the entire segment. In the case where the filaments extend through the die at the intersections of the shallow grooves in the die, the filaments may accordingly be embedded axially along the corresponding intersections of the cell walls of the structure segment as it is extruded. In a particular embodiment, the feed holes in the die through which the filaments extend may be of a larger diameter than the non-filament feed holes which supply only the slurry to the face of the die. Further, the filaments may optionally be extended through the face of the die prior to the extrusion of the structure segment, such that a traction force may be controllably applied to the filaments to pull the filaments through the die during the extrusion process, to match the extrusion rate of the slurry through the die, and to control and desirably minimize potential shearing between the filaments and the green honeycomb structure segment as it is extruded.

After the green parallel passage fluid contactor structure segment is extruded from the die, it is cured to form a stable cured structure segment. Curing may comprise a drying, firing, chemical curing and/or other curing process suited to cure the particular slurry composition used to form the structure segment. Where the slurry and structure segment comprise an active compound which requires activation, the parallel passage contactor structure may also be activated in an activation process. In some embodiments, such an activation process may be combined with a curing process such as firing, for example.

According to an alternative embodiment, a green parallel passage fluid contactor structure segment may be extruded without the inclusion of axially continuous thermally and/or electrically conductive filaments. In such case, following the extrusion of the green structure segment, a plurality of axially continuous thermally and/or electrically conductive filaments may be inserted axially into the structure segment such as along fluid flow passages, and may be embedded into the cell walls of the structure, or otherwise situated within the cell walls, such as by adhering the filaments to the cell walls using the slurry material used to extrude the structure segment, or another suitable adhesive and/or thermally conductive curing material, so that the filaments are suitably embedded or otherwise enclosed within the cell walls and are operable to transfer thermal energy to and/or from at least a portion of the cell walls of the structure segment. After the insertion of the filaments to extend continuously in the axial direction through the green structure segment, the segment may be cured and/or activated such as described above. In yet a further embodiment, the slurry used to form the structure segment may optionally comprise a porosity-enhancing compound. In such case, following the extrusion of the green structure segment, the porosity-enhancing compound may be burned off and/or otherwise volatilized to create additional porosity in the structure, such as increasing the porosity of the cell walls of the structure, for example. Such enhanced porosity of the cell walls of the structure may be particularly desirable for use in wall-flow embodiments of the parallel passage fluid contactor structure, such as described above in reference to FIG. 3, for example.

In some embodiments, multiple parallel passage fluid contactor structure segments may be fluidly connected to form a multi-segment structure, such as described above in reference to FIGS. 4 and 6, for example. In such multi-segment structures, one or more segments may be thermally connected to each other, such as by thermally connecting the filaments in each segment, for example. In embodiments where the conductive filaments are thermally and also electrically conductive, one or more segments may also optionally be connected electrically, such as by electrical connection of the electrically conductive filaments in each segment, for example.

In an alternative embodiment, a corrugated parallel passage fluid contactor structure similar to as described above in reference to FIG. 7 may be manufactured according to a similar manufacturing method. In a method for manufacturing a corrugated structure segment, a suitable slurry comprising at least one structural compound may instead be extruded or tape cast into multiple green structural sheets. Such structural sheets may be formed into a substantially planar corrugated green structure comprising axially oriented parallel fluid flow passages and cell walls between said flow passages, and axially continuous thermally and/or electrically conductive filaments may be appropriately embedded in or otherwise placed within the cell walls such that they are operable to transfer thermal energy to and/or from the cell walls of the corrugated structure. The corrugated structural sheet may then be stacked in multiple planar layers, and/or rolled concentrically to form a green multi-layer corrugated parallel passage fluid contactor structure. Then, the green multi-layer structure may be cured and/or activated to form the finished corrugated parallel passage fluid contactor structure.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A parallel passage fluid contactor structure comprising one or more segments, each segment comprising: a plurality of substantially parallel fluid flow passages oriented in an axial direction; cell walls situated between each adjacent one of said fluid flow passages, each said cell wall comprising at least a first and a second cell wall surface, and additionally comprising at least one active compound, said active compound comprising at least one of an active adsorbent, absorbent or catalytic compound; and further comprising a plurality of axially continuous filaments either embedded in said cell walls or situated within said cell walls, wherein said axially continuous filaments are at least one of thermally and electrically conductive, are oriented in said axial direction, and are additionally in direct contact with said at least one active compound of said cell walls and are operable to transfer thermal energy between said at least one active material and said conductive filaments.

2. The parallel passage fluid contactor structure according to claim 1 wherein said cell walls comprise at least one of: a honeycomb structure, a corrugated structure, and a stacked parallel plate structure.

3. The parallel passage fluid contactor structure according to claim 1, wherein said cell walls comprise at least one of a ceramic material, a carbon material and a polymer material.

4. The parallel passage fluid contactor structure according to claim 2, wherein said substantially parallel fluid flow passages are one or more of: substantially rectangular, square, hexagonal, round and obround in cross-sectional shape.

5. The parallel passage fluid contactor structure according to claim 1 wherein said axially continuous conductive filaments comprise one or more of: carbon, carbon fiber, aluminum, copper, tungsten, silver, gold, and alloys or composite materials thereof.

6. The parallel passage fluid contactor structure according to claim 1 wherein said axially continuous conductive filaments comprise one or more of a phenolic resin carbon fiber, a mesophase carbon fiber, a graphitic carbon material and a carbon nanotube material, and wherein said filaments have an axial thermal conductivity of at least 400 W/mK.

7. The parallel passage fluid contactor structure according to claim 1 wherein said axially continuous conductive filaments extend between a first end and a second end of said segment.

8. The parallel passage fluid contactor structure according to claim 1 wherein said conductive filaments are additionally operable to be resistively heated upon application of an electrical current through said conductive filaments in an axial direction.

9. The parallel passage fluid contactor structure according to claim 1 wherein said at least one active compound comprises one or more of: a desiccant, activated carbon, carbon adsorbent, graphite, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, unipolar resin, bi-polar resin, aromatic cross-linked polystyrenic matrix, brominated aromatic matrix, methacrylic ester copolymer, graphitic adsorbent, carbon fiber, carbon nanotube, nano-materials, metal salt adsorbent, perchlorate, oxalate, alkaline earth metal particle, ETS, CTS, metal oxide, catalyst, chemisorbent, amine, organo-metallic reactant, and metal organic framework adsorbent compound, and combinations thereof.

10. The parallel passage fluid contactor structure according to claim 1 wherein said cell walls additionally comprise at least one inactive binder or other structural material.

11. The parallel passage fluid contactor structure according to claim 1 wherein at least a portion of said substantially parallel fluid passages are substantially blocked at one end of said structure.

12. The parallel passage fluid contactor structure according to claim 1 comprising first and second segments, wherein said first segment comprises at least a first active compound, and said second segment comprises at least a second active compound.

13. The parallel passage fluid contactor structure according to claim 12 wherein said first and second segments are fluidly connected sequentially one after the other in an axial configuration, such that fluid may flow sequentially through said first segment and said second segment.

14. The parallel passage fluid contactor structure according to claim 13, wherein said axially continuous conductive filaments of said first segment are at least one of thermally and electrically connected to said axially continuous conductive filaments of said second segment.

15. The parallel passage fluid contactor structure according to claim 1 wherein said axially continuous conductive filaments are connected thermally to a thermal circuit external to said segment.

16. The parallel passage fluid contactor structure according to claim 1 wherein said axially continuous conductive filaments are connected electrically to an electrical circuit external to said segment.

17. The parallel passage fluid contactor structure according to claim 1 wherein said structure comprises an anisotropic thermal conductivity wherein said structure comprises a first thermal conductivity in said axial direction greater than a second thermal conductivity in a transverse direction substantially perpendicular to said axial direction.

18. The parallel passage fluid contactor structure according to claim 1 wherein at least one segment additionally comprises transversally continuous conductive filaments oriented in a transverse direction, substantially perpendicular to said axial direction, and said transversally continuous conductive filaments are at least one of thermally and electrically conductive, are in direct contact with said at least one active compound of said cell walls and are operable to transfer thermal energy between said at least one active material and said transversally continuous conductive filaments.

19. The parallel passage fluid contactor structure according to claim 1, wherein at least one segment of said structure has a bulk thermal conductivity in said axial direction greater than 0.25 W/mK.

20. A parallel passage fluid contactor structure comprising one or more segments, each segment comprising: a plurality of substantially parallel fluid flow passages oriented in an axial direction; cell walls situated between each adjacent one of said fluid flow passages and arranged in a honeycomb configuration, said cell walls comprising at least one of a ceramic, polymer and carbon material and each said cell wall comprising at least a first and a second cell wall surface; and a plurality of axially continuous conductive filaments either embedded in said cell walls or situated within said cell walls, wherein said axially continuous conductive filaments are at least one of thermally and electrically conductive, are oriented in said axial direction, and are operable to transfer thermal energy between said cell walls and said conductive filaments.

21. The parallel passage fluid contactor structure according to claim 20, wherein said cell walls additionally comprise at least one active compound, said active compound comprising at least one of an active adsorbent, absorbent or catalytic compound, applied to at least a portion of said cell wall surfaces, and wherein said at least one active compound comprises one or more of: a desiccant, activated carbon, carbon adsorbent, graphite, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, unipolar resin, bi-polar resin, aromatic cross-linked polystyrenic matrix, brominated aromatic matrix, methacrylic ester copolymer, graphitic adsorbent, carbon fiber, carbon nanotube, nano-materials, metal salt adsorbent, perchlorate, oxalate, alkaline earth metal particle, ETS, CTS, metal oxide, catalyst, chemisorbent, amine, organo-metallic reactant, and metal organic framework adsorbent compound, and combinations thereof.

22. The parallel passage fluid contactor structure according to claim 20, wherein said axially continuous conductive filaments extend between a first end and a second end of said segment.

* * * * *